(12) United States Patent
Andrews et al.

(10) Patent No.: US 11,053,162 B2
(45) Date of Patent: Jul. 6, 2021

(54) LITHIUM CONTAINING GLASS OR GLASS CERAMIC ARTICLE WITH MODIFIED $K_2O$ PROFILE NEAR THE GLASS SURFACE

(71) Applicant: CORNING INCORPORATED, Corning, NY (US)

(72) Inventors: Ryan Claude Andrews, Elmira, NY (US); Jill Marie Hall, Campbell, NY (US); Pascale Oram, Hammondsport, NY (US); Rostislav Vatchev Roussev, Painted Post, NY (US); Vitor Marino Schneider, Painted Post, NY (US); Ljerka Ukrainczyk, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 52 days.

(21) Appl. No.: 15/750,051

(22) PCT Filed: Feb. 2, 2017

(86) PCT No.: PCT/US2017/016249
§ 371 (c)(1),
(2) Date: Feb. 2, 2018

(87) PCT Pub. No.: WO2018/143991
PCT Pub. Date: Aug. 9, 2018

(65) Prior Publication Data
US 2019/0389764 A1    Dec. 26, 2019

(51) Int. Cl.
*B32B 15/04*    (2006.01)
*B32B 17/06*    (2006.01)
(Continued)

(52) U.S. Cl.
CPC .......... *C03C 10/0018* (2013.01); *C03C 3/085* (2013.01); *C03C 3/097* (2013.01); *C03C 21/002* (2013.01)

(58) Field of Classification Search
USPC .................................................. 428/410, 426
See application file for complete search history.

(56) References Cited

U.S. PATENT DOCUMENTS 9,140,543 B1    9/2015  Allan et al.
9,284,218 B1 *  3/2016  Mauro ................... G06F 30/20
(Continued)

FOREIGN PATENT DOCUMENTS

DE    102013110098 A1    9/2014
EP         1717613 A1   11/2006
(Continued)

OTHER PUBLICATIONS

Araujo et al. "Ion exchange equilibria between glass and molten salts" Journal of Non-Crystalline Solids 318 (2003), pp. 262-267.
(Continued)

*Primary Examiner* — Lauren R Colgan
(74) *Attorney, Agent, or Firm* — Kevin M. Johnson

(57) ABSTRACT

A method of reworking lithium containing ion exchanged glass articles is provided. The method includes a reverse ion exchange process that returns the glass article to approximately the composition of the glass from which the glass article was produced, before being subjected to ion exchange. The reworked glass articles exhibit a $K_2O$ concentration profile comprising a portion wherein a $K_2O$ concentration increases to a local $K_2O$ concentration maximum.

16 Claims, 27 Drawing Sheets

(51) Int. Cl.
  *C03C 10/00* (2006.01)
  *C03C 3/085* (2006.01)
  *C03C 3/097* (2006.01)
  *C03C 21/00* (2006.01)

(56) References Cited

U.S. PATENT DOCUMENTS

| | | | | |
|---|---|---|---|---|
| 9,387,651 B2* | 7/2016 | Cleary | .................... | C03C 3/095 |
| 2010/0009154 A1* | 1/2010 | Allan | ....................... | C03C 3/085 |
| | | | | 428/220 |
| 2011/0045961 A1* | 2/2011 | Dejneka | .................. | C03C 3/085 |
| | | | | 501/66 |
| 2012/0052271 A1* | 3/2012 | Gomez | ................. | C03C 21/002 |
| | | | | 428/213 |
| 2012/0194974 A1* | 8/2012 | Weber | ................... | C03C 21/002 |
| | | | | 361/679.01 |
| 2013/0224492 A1* | 8/2013 | Bookbinder | .......... | C03C 21/002 |
| | | | | 428/410 |
| 2013/0274085 A1* | 10/2013 | Beall | ....................... | C03C 14/00 |
| | | | | 501/32 |
| 2015/0329413 A1* | 11/2015 | Beall | ....................... | C03B 32/02 |
| | | | | 501/32 |
| 2016/0102014 A1* | 4/2016 | Hu | ......................... | C03C 23/007 |
| | | | | 428/220 |

FOREIGN PATENT DOCUMENTS

| | | |
|---|---|---|
| JP | 2015-520097 A | 7/2015 |
| JP | 2016044119 A | 4/2016 |
| JP | 2017-001902 A | 1/2017 |
| TW | 201341324 A | 10/2013 |
| WO | 2013/155281 A1 | 10/2013 |

OTHER PUBLICATIONS

Cleveland, "Robust Locally Weighted Regression and Smoothing Scatterplots", Journal of the American Statistical Association, vol. 74, No. 368 (Dec. 1979), p. 829-836.
Japanese Patent Application No. 2019-541738 Notification of Grounds of Rejection dated Dec. 2, 2020; 6 pages; (3 pages of English Translation and 3 pages of Original Document) Japanese Patent Office.
Taiwanese Patent Application No. 106103629, Office Action dated Apr. 23, 2021, 2 pages (English Translation Only); Taiwanese Patent Office.

* cited by examiner

LITHIUM CONTAINING GLASS OR GLASS CERAMIC ARTICLE WITH MODIFIED K₂O PROFILE NEAR THE GLASS SURFACE

This application is a national phase of International Patent Application PCT/US2017/016249, filed on Feb. 2, 2017, the content of which is incorporated herein by reference in its entirety.

BACKGROUND

The disclosure relates to a chemically strengthened glass article. More particularly, the disclosure relates to chemically strengthened glass articles comprising a surface layer having a compressive stress and a $K_2O$ concentration peak below the surface of the glass article.

Glass articles are widely used in electronic devices as cover plates or windows for portable or mobile electronic communication and entertainment devices, such as cellular phones, smart phones, tablets, video players, information terminal (IT) devices, laptop computers and the like, as well as in other applications. As glass articles become more widely used, it has become more important to develop strengthened glass articles having improved survivability, especially when subjected to tensile stresses and/or relatively deep flaws caused by contact with hard and/or sharp surfaces.

The chemical strengthening process may produce glass articles with surface defects, such as scratches, or undesired stress profiles. For economic reasons, it is desirable to rework glass articles with such defects to increase the yield of strengthened glass articles with the desired characteristics. However, removing material from the surface of strengthened glass articles necessitates the re-ion exchange of the material to achieve the desired surface compressive stress characteristics, which can produce undesired dimensional changes or warping of the glass article. Additionally, the re-ion exchange step may produce undesired internal diffusion of the ions introduced during the chemical strengthening procedure and relaxation of the stress in the glass article. Thus, there is a need for a process to increase the yield of chemically strengthened articles by enabling the rework of chemically strengthened glass articles with an non-desired stress profile or surface defects such that the resulting glass articles exhibit a desired stress profile and surface compressive stress.

SUMMARY

The present disclosure provides in aspect (1) an alkali aluminosilicate glass article comprising: $Li_2O$, $Na_2O$, and $K_2O$; a compressive stress layer extending from a surface of the alkali aluminosilicate glass to a depth of compression (DOC); a tensile region extending from the depth of layer into the glass article and having a maximum tensile stress of at least about 40 MPa; and a $K_2O$ concentration profile comprising a portion wherein a $K_2O$ concentration increases to a local $K_2O$ concentration maximum.

In aspect (2) the alkali aluminosilicate glass article of aspect (1) is provided, wherein the local $K_2O$ concentration maximum is located at a depth in a range from about 3 μm to about 30 μm below the surface of the alkali aluminosilicate glass article.

In aspect (3) the alkali aluminosilicate glass article of aspects (1) or (2) is provided, wherein the local $K_2O$ concentration maximum has a $K_2O$ concentration of 0.05 mol % to 1.2 mol %.

In aspect (4) of the alkali aluminosilicate glass article of any of the preceding aspects is provided, wherein the local $K_2O$ concentration maximum has a $K_2O$ concentration of 0.5% to 15% of the $K_2O$ concentration at the surface of the alkali aluminosilicate glass article.

In aspect (5) the alkali aluminosilicate glass article of any of the preceding aspects is provided, wherein the maximum tensile stress is at least about 50 MPa.

In aspect (6) the alkali aluminosilicate glass article of any of the preceding aspects is provided, wherein a maximum compressive stress of the compressive stress layer is at least about 600 MPa.

In aspect (7) the alkali aluminosilicate glass article of any of the preceding aspects is provided, further comprising from about 0.1 mol % to about 10 mol % $B_2O_3$.

In aspect (8) the alkali aluminosilicate glass article of any of the preceding aspects is provided, wherein the alkali aluminosilicate glass article is substantially free of $B_2O_3$.

In aspect (9) the alkali aluminosilicate glass article of any of the preceding aspects is provided, wherein the alkali aluminosilicate glass article comprises: from about 58 mol % to about 65 mol % $SiO_2$; from about 11 mol % to about 20 mol % $Al_2O_3$; from about 6 mol % to about 18 mol % $Na_2O$; from 0 mol % to about 6 mol % MgO; from 0.1 mol % to about 13 mol % $Li_2O$; and from 0 mol % to about 6 mol % ZnO.

In aspect (10) the alkali aluminosilicate glass article of any of the preceding aspects is provided, wherein the alkali aluminosilicate glass article comprises from about 0.5 mol % to about 2.8 mol % $P_2O_5$.

In aspect (11) the alkali aluminosilicate glass article of any of the preceding aspects is provided, further comprising a thickness in a range from about 0.05 mm to about 1.5 mm.

In aspect (12) the alkali aluminosilicate glass article of any of the preceding aspects is provided, further comprising at least one of silver, copper, cesium, and rubidium.

In aspect (13) the alkali aluminosilicate glass article of any of the preceding aspects is provided, wherein the alkali aluminosilicate glass article comprises a glass ceramic.

In aspect (14) a consumer electronic device is provided comprising: a housing; electrical components provided at least partially internal to the housing, the electrical components including at least a controller, a memory, and a display, the display being provided at or adjacent to a front surface of the housing; and a cover article disposed at or over the front surface of the housing and over the display, wherein the housing or cover article comprises the alkali aluminosilicate glass article of any of the preceding aspects.

In aspect (15) an alkali aluminosilicate glass article is provided comprising: $Li_2O$, $Na_2O$, and $K_2O$; a compressive stress layer extending from a surface of the alkali aluminosilicate glass to a depth of compression (DOC); a tensile region extending from the depth of layer into the glass article and having a maximum tensile stress of at least about 40 MPa; and a $K_2O$ concentration at a depth of about 15 μm to about 25 μm that is at least about 0.3 mol % higher than a $K_2O$ concentration at a center of the alkali aluminosilicate glass article.

In aspect (16) the alkali aluminosilicate glass article of aspect (15) is provided, wherein the local $K_2O$ concentration maximum has a $K_2O$ concentration of 0.3 mol % to 1.2 mol %.

In aspect (17) the alkali aluminosilicate glass article of aspects (15) or (16) is provided, wherein a depth of about 15 μm to about 25 μm comprises a $K_2O$ concentration from 0.5% to 15% of the $K_2O$ concentration at the surface of the alkali aluminosilicate glass article.

In aspect (18) the alkali aluminosilicate glass article of any of aspects (15) to (17) is provided, wherein a maximum compressive stress of the compressive stress layer is at least about 600 MPa.

In aspect (19) the alkali aluminosilicate glass article of any of aspects (15) to (18) is provided, further comprising a thickness in a range from about 0.05 mm to about 1.5 mm.

In aspect (20) the alkali aluminosilicate glass article of any of aspects (15) to (19) is provided, further comprising at least one of silver, copper, cesium, and rubidium.

In aspect (21) the alkali aluminosilicate glass article of any of aspects (15) to (20) is provided, wherein the alkali aluminosilicate glass article comprises a glass ceramic.

In aspect (22) a method is provided comprising: reverse ion exchanging an ion exchanged glass article in a reverse ion exchange bath to produce a reverse ion exchanged glass article, wherein the reverse ion exchange bath comprises a lithium salt; and re-ion exchanging the reverse ion exchanged glass article in a re-ion exchange bath to form a re-ion exchanged glass article, wherein the re-ion exchanged glass article comprises: $Li_2O$, $Na_2O$, and $K_2O$; a compressive stress layer extending from a surface of the re-ion exchanged glass article to a depth of compression (DOC); a tensile region extending from the depth of layer into the re-ion exchanged glass article and having a maximum tensile stress of at least about 40 MPa; and a $K_2O$ concentration profile comprising a portion wherein a $K_2O$ concentration increases to a local $K_2O$ concentration maximum.

In aspect (23) the method of aspect (22) is provided, further comprising: removing between 1 µm and 10 µm from the surface of the reverse ion exchanged glass article.

In aspect (24) the method of aspect (23) is provided, wherein the removing comprises mechanical polishing or chemical etching.

In aspect (25) the method of any of aspects (22) to (24) is provided, wherein the reverse ion exchange bath comprises: 3 wt % to 40 wt % $LiNO_3$; and 55 wt % to 97 wt % $NaNO_3$.

In aspect (26) the method of any of aspects (22) to (25) is provided, wherein the reverse ion exchange bath comprises at most 1 wt % $KNO_3$.

In aspect (27) the method of any of aspects (22) to (26) is provided, wherein the reverse ion exchange bath is free of $KNO_3$.

In aspect (28) the method of any of aspects (22) to (27) is provided, wherein the reverse ion exchange bath is at a temperature of about 320° C. to about 520° C.

In aspect (29) the method of any of aspects (22) to (28) is provided, further comprising reverse ion exchanging the reverse ion exchanged glass article in a second reverse ion exchange bath, wherein the second reverse ion exchange bath comprises a lithium salt.

In aspect (30) the method of aspect (29) is provided, wherein the second reverse ion exchange bath comprises: 0.1 wt % to about 5.0 wt % $LiNO_3$; and $NaNO_3$.

In aspect (31) the method of aspects (29) or (30) is provided, wherein the second reverse ion exchange bath is substantially free of $KNO_3$.

In aspect (32) the method of any of aspects (29) to (31) is provided, wherein the reverse ion exchange in the second reverse ion exchange bath extends for a period of about 5 to about 30 minutes.

In aspect (33) the method of any of aspects (29) to (32) is provided, wherein the second reverse ion exchange bath is at a temperature of about 320° C. to about 520° C.

In aspect (34) the method of any of aspects (22) to (33) is provided, wherein the reverse ion exchange in the reverse ion exchange bath extends for a period of about 2 hours to about 48 hours.

In aspect (35) the method of any of aspects (22) to (34) is provided, wherein the re-ion exchange bath comprises: about 15 wt % to about 40 wt % $NaNO_3$; and about 60 wt % to about 85 wt % $KNO_3$.

In aspect (36) the method of any of aspects (22) to (35) is provided, wherein the re-ion exchange in the re-ion exchange bath extends for a period of about 30 minutes to about 120 minutes.

In aspect (37) the method of any of aspects (22) to (36) is provided, wherein the re-ion exchange bath is at a temperature of about 350° C. to about 420° C.

In aspect (38) the method of any of aspects (22) to (37) is provided, further comprising re-ion exchanging the re-ion exchanged glass article in a second re-ion exchange bath.

In aspect (39) the method of aspect (38) is provided, wherein the second re-ion exchange bath comprises: about 3 wt % to about 15 wt % $NaNO_3$; and about 85 wt % to about 97 wt % $KNO_3$.

In aspect (40) the method of aspects (38) or (39) is provided, wherein the second re-ion exchange bath is at a temperature of about 350° C. to about 420° C.

In aspect (41) the method of any of aspects (38) to (40) is provided, wherein the re-ion exchange in the second re-ion exchange bath extends for a period of about 10 minutes to about 30 minutes.

In aspect (42) the method of any of aspects (22) to (41) is provided, further comprising ion exchanging a glass article in an ion exchange bath to form the ion exchanged glass article.

In aspect (43) the method of aspect (42) is provided, wherein the ion exchange bath comprises: about 15 wt % to about 40 wt % $NaNO_3$; and about 60 wt % to about 85 wt % $KNO_3$.

In aspect (44) the method of aspects (42) or (43) is provided, wherein the ion exchange in the ion exchange bath extends for a period of about 30 minutes to about 120 minutes.

In aspect (45) the method of any of aspects (42) to (44) is provided, wherein the ion exchange bath is at a temperature of about 350° C. to about 420° C.

In aspect (46) the method of any of aspects (42) to (45) is provided, further comprising ion exchanging the ion exchanged glass article in a second ion exchange bath.

In aspect (47) the method of aspect (46), wherein the second ion exchange bath comprises: about 3 wt % to about 15 wt % $NaNO_3$; and about 85 wt % to about 97 wt % $KNO_3$.

In aspect (48) the method of aspects (46) or (47) is provided, wherein the second ion exchange bath is at a temperature of about 350° C. to about 420° C.

In aspect (49) the method of any of aspects (46) to (48), wherein the re-ion exchange in the second re-ion exchange bath extends for a period of about 10 minutes to about 30 minutes.

In aspect (50) the method of any of aspects (22) to (49) is provided, wherein the re-ion exchanged glass article comprises: a $Li_2O$ concentration at a depth of 10 µm below a surface of the re-ion exchanged glass article of about 0.5% to about 20% of the $Li_2O$ concentration at the surface of the re-ion exchanged glass article; and a $K_2O$ concentration at a depth of 10 µm below the surface of the re-ion exchanged glass article of about 0.5% to about 20% of the $K_2O$ concentration at the surface of the re-ion exchanged glass article.

In aspect (51) a lithium containing glass article is provided comprising: an intensity coupling profile including a plurality of coupling resonances; wherein a first of the coupling resonances has a half-width half-maximum value that is at least 1.8 times greater than the half-width half-maximum value of a second of the coupling resonances.

In aspect (52) the lithium containing glass article of aspect (51) is provided, wherein the first of the coupling resonances has a half-width half-maximum value that is at least 2 times greater than the half-width half-maximum value of a second of the coupling resonances.

In aspect (53) the lithium containing glass article of aspects (51) or (52) is provided, wherein an intensity coupling profile of both the transverse magnetic polarization and the transverse electronic polarization comprises a first of the coupling resonances has a half-width half-maximum value that is at least 1.8 times greater than the half-width half-maximum value of a second of the coupling resonances.

In aspect (54) the lithium containing glass article of any of aspects (51) to (53) is provided, wherein a first of the coupling resonances has a half-width half-maximum value that is at least 1.8 times greater than the half-width half-maximum value of a second of the coupling resonances and a third of the coupling resonances.

In aspect (55) a lithium containing glass article is provided, comprising: a smoothed intensity coupling profile including a plurality of coupling resonances; wherein a second derivative of the smoothed intensity coupling profile at a first of the coupling resonances is at least 1.8 times greater than a second derivative of the smoothed coupling profile at a second of the coupling resonances.

In aspect (56) the lithium containing glass article of aspect (55) is provided, wherein the second derivative of the smoothed intensity coupling profile at the first of the coupling resonances is at least 1.8 times greater than the second derivative of the smoothed coupling profile at the second of the coupling resonances.

In aspect (57) the lithium containing glass article of aspect (55) or (56) is provided, wherein an intensity coupling profile of both the transverse magnetic polarization and the transverse electronic polarization comprises a second derivative of the smoothed intensity coupling profile at a first of the coupling resonances is at least 1.8 times greater than a second derivative of the smoothed coupling profile at a second of the coupling resonances.

In aspect (58) the lithium containing glass article of any of aspects (55) to (57) is provided, wherein a second derivative of the smoothed intensity coupling profile at a first of the coupling resonances is at least 1.8 times greater than a second derivative of the smoothed coupling profile at a second of the coupling resonances and a third of the coupling resonances.

These and other aspects, advantages, and salient features will become apparent from the following detailed description, the accompanying drawings, and the appended claims.

DETAILED DESCRIPTION

Figure 1:
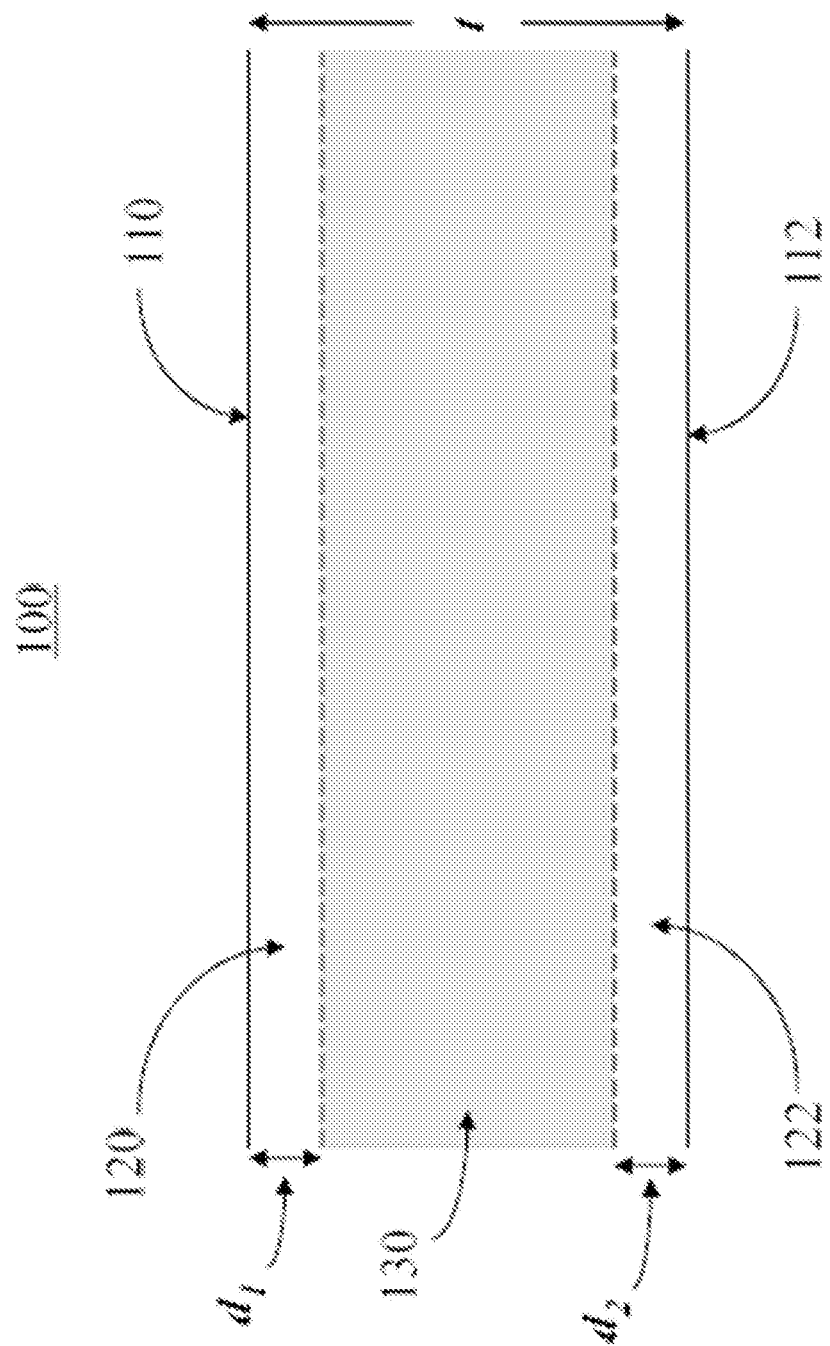
FIG. 1 is a schematic cross-sectional view of a strengthened alkali aluminosilicate glass article according to one or more embodiments.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass article" is used in its broadest sense to include any object made wholly or partly of glass, including glass ceramics. Unless otherwise specified, all compositions of the glasses described herein are expressed in terms of mole percent (mol %), and the constituents are provided on an oxide basis. Coefficients of thermal expansion (CTE) are expressed in terms of parts per million (ppm)/° C. and represent a value measured over a temperature range from about 20° C. to about 300° C., unless otherwise specified. High temperature (or liquid) coefficients of thermal expansion (high temperature CTE) are also expressed in terms of part per million (ppm) per degree Celsius (ppm/° C.), and represent a value measured in the high temperature plateau region of the instantaneous coefficient of thermal expansion (CTE) vs. temperature curve. The high temperature CTE measures the volume change associated with heating or cooling of the glass through the transformation region.

Unless otherwise specified, all temperatures are expressed in terms of degrees Celsius (° C.). As used herein the term "softening point" refers to the temperature at which the viscosity of a glass is approximately $10^{7.6}$ poise (P), the term "anneal point" refers to the temperature at which the viscosity of a glass is approximately $10^{13.2}$ poise, the term "200 poise temperature ($T^{200P}$)" refers to the temperature at which the viscosity of a glass is approximately 200 poise, the term "$10^{11}$ poise temperature" refers to the temperature at which the viscosity of a glass is approximately $10^{11}$ poise, the term "35 kP temperature ($T^{35\ kP}$)" refers to the temperature at which the viscosity of a glass is approximately 35 kilopoise (kP), and the term "160 kP temperature ($T^{160\ kP}$)" refers to the temperature at which the viscosity of a glass is approximately 160 kP.

As used herein, the term "zircon breakdown temperature" or "$T^{breakdown}$" refers to the temperature at which zircon—which is commonly used as a refractory material in glass processing and manufacture—breaks down to form zirconia and silica, and the term "zircon breakdown viscosity" refers to the viscosity of the glass at $T^{breakdown}$. The term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. The term "35 kP temperature" or "$T^{35\ kP}$" refers to the temperature at which the glass or glass melt has a viscosity of 35,000 Poise (P), or 35 kiloPoise (kP).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum tensile stress or central tension (CT) values are measured using a scattered light polariscope (SCALP) technique known in the art.

As used herein, depth of compression (DOC) means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

The depth of penetration of K+ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are methods for reworking chemically strengthened glass articles which exhibit a manufacturing defect, and the resulting reworked glass articles. The defects may include surface defects or undesired stress profiles. Surface defects may be the result of handling during the manufacturing process, and may include scratches, dents, and dimples. An undesired stress profile may result from ion exchange conditions that are outside of specifications.

Surface defects may be removed from a chemically strengthened glass article by removing material from the surface, such as by polishing or etching. The removal of material from the surface of the glass article also removes a portion of the glass article that is under compressive stress. Thus, the glass article must be subjected to an additional ion exchange to achieve the desired stress profile after removing material from the surface. The additional ion exchange may negatively impact the strength and dimensional stability of the glass article. For example, the additional ion exchange may produce internal diffusion and stress relaxation in the glass article, as well as result in part growth that renders the glass article outside of desired dimensional tolerances.

The methods described herein include a reverse ion exchange step that serves to return the chemically strengthened glass articles to approximately the composition of the glass article prior to the chemical strengthening ion exchange. The reverse ion exchange step employs a reverse ion exchange bath comprising a lithium salt and a sodium salt. After the reverse ion exchange the glass article may be optionally processed to remove material from the surface before re-ion exchanging the glass article to produce a desired stress profile. The reworked glass articles contain a buried high index peak that corresponds to a $K_2O$ concentration profile having a portion wherein the $K_2O$ concentration increases to a local $K_2O$ concentration maximum, allowing the reworked glass articles to be distinguished from a non-reworked glass article.

Figure 2:
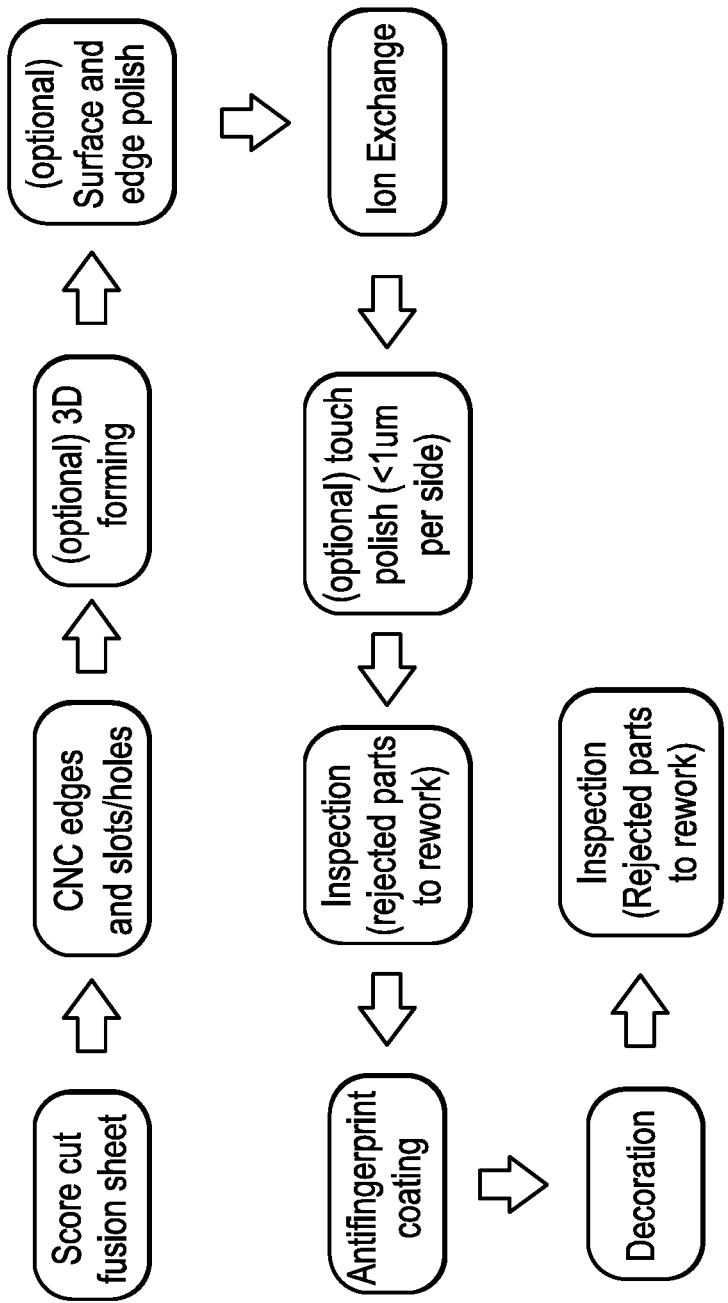
FIG. 2 is a flow chart of a production process of an ion exchanged glass article.

An exemplary process for manufacturing a chemically strengthened glass article and determining whether parts require rework is illustrated in FIG. 2. As shown in FIG. 2, the glass article manufacturing process may include score cutting a glass sheet formed by a fusion process, machining the edges and/or forming holes in the resulting parts, optionally 3-D forming the machined parts, and then optionally polishing the edges and surface of the parts. The parts are then chemically strengthened in an ion exchange process to form ion exchanged glass articles. The ion exchanged glass articles are then optionally polished to remove less than 1 μm of material from each side of the ion exchanged glass articles before inspecting the glass articles to determine if they meet manufacturing standards. The parts that do not meet the desired standards are then processed as rework to increase the yield of the manufacturing process. Parts may fail to meet manufacturing standards for a variety of reasons, such as including surface defects or having an undesired stress profile. Surface defects may be formed as a result of handling during various stages of the manufacturing process. After inspection the parts which were not designated for rework may have an anti-fingerprint coating and/or decoration applied. The parts are then inspected again to determine if they meet manufacturing standards, and the parts that fail to meet the manufacturing standards are processed as rework.

Figure 3:
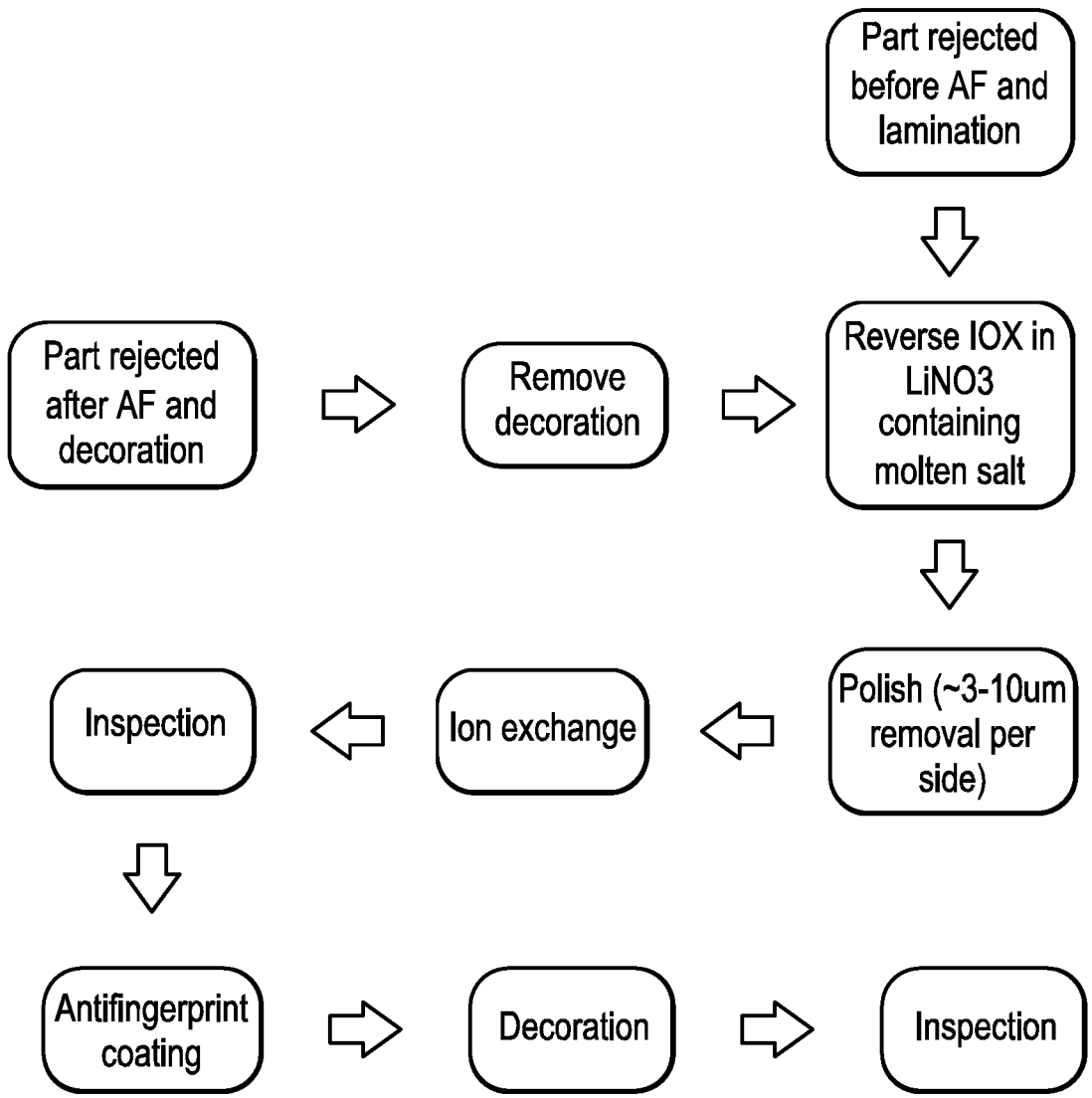
FIG. 3 is a flow chart of a rework process including a reverse ion exchange process.

FIG. 3 illustrates an exemplary rework processing method. In some embodiments, one or more of the steps shown in FIG. 3 are not performed. In some embodiments, additional steps not shown in FIG. 3 may be performed as part of the rework processing method. The rework processing method includes reverse ion exchanging the ion exchanged glass articles in a lithium salt containing reverse ion exchange bath to produce a reverse ion exchanged glass article. If the ion exchanged articles include a decoration, the decoration may be removed before the reverse ion exchange. In some embodiments, anti-fingerprint (AF) coatings do not need to be removed before the ion exchanged glass articles are subjected to reverse ion exchange. The reverse ion exchanged glass articles may be optionally subjected to mechanical polishing or chemical etching to remove material from the surface of the reverse ion exchanged glass articles. Removing material from the surface of the reverse ion exchanged glass articles may also remove surface defects. The reverse ion exchanged glass articles may then be re-ion exchanged in a re-ion exchange bath to form a re-ion exchanged glass article. The re-ion exchanged glass article is then inspected to determine whether the part falls within the desired manufacturing standards. An anti-fingerprint coating and/or a decoration may then be applied to the re-ion exchanged glass article before a final inspection to determine whether the part falls within the desired manufacturing standards.

The reverse ion exchange process removes ions from the ion exchanged glass article to return the glass article to approximately its pre-ion exchange state. The composition of the reverse ion exchange bath is selected to remove the ions added to the glass article during the ion exchange process. In some embodiments, for example, but not limited to, when the non-ion-exchanged glass article comprises $Li_2O$ and $Na_2O$, the reverse ion exchange bath may contain $LiNO_3$ and $NaNO_3$, with the relative amounts of $LiNO_3$ and $NaNO_3$ selected such that equilibrium weight gain of the non-ion exchanged glass article in the reverse ion exchange bath is near zero or positive. If the $LiNO_3$ content of the reverse ion exchange bath is too high, an excess of $LiO_2$ may accumulate in the surface of the reverse ion exchanged glass article, producing surface tension that may produce surface cracks in the glass articles. The reverse ion exchange bath may include about 3 wt % to about 40 wt % $LiNO_3$; such as 3 wt % to about 33 wt % $LiNO_3$; about 5 wt % to about 30 wt % $LiNO_3$, about 10 wt % to about 25 wt % $LiNO_3$, about 15 wt % to about 20 wt % $LiNO_3$, or any sub-ranges contained therein or defined by any of these end points. The reverse ion exchange bath may contain about 55 wt % to about 97 wt % $NaNO_3$; such as about 60 wt % to about 97 wt % $NaNO_3$; about 67 wt % to about 97 wt % $NaNO_3$; about 70 wt % to about 95 wt % $NaNO_3$, about 75 wt % to about 90 wt % $NaNO_3$, about 80 wt % to about 85 wt % $NaNO_3$, or any sub-ranges contained therein or defined by any of these end points. In some embodiments, up to about 5 wt % of the $NaNO_3$ in the reverse ion exchange bath may be replaced by $KNO_3$, such as in situations where the same reverse ion exchange bath is employed for multiple rework process cycles and potassium removed from the glass article poisons the reverse ion exchange bath. In some embodiments, the reverse ion exchange bath may contain less than about 5 wt % $KNO_3$, less than about 1 wt % $KNO_3$, and may be free of $KNO_3$.

Figure 4:
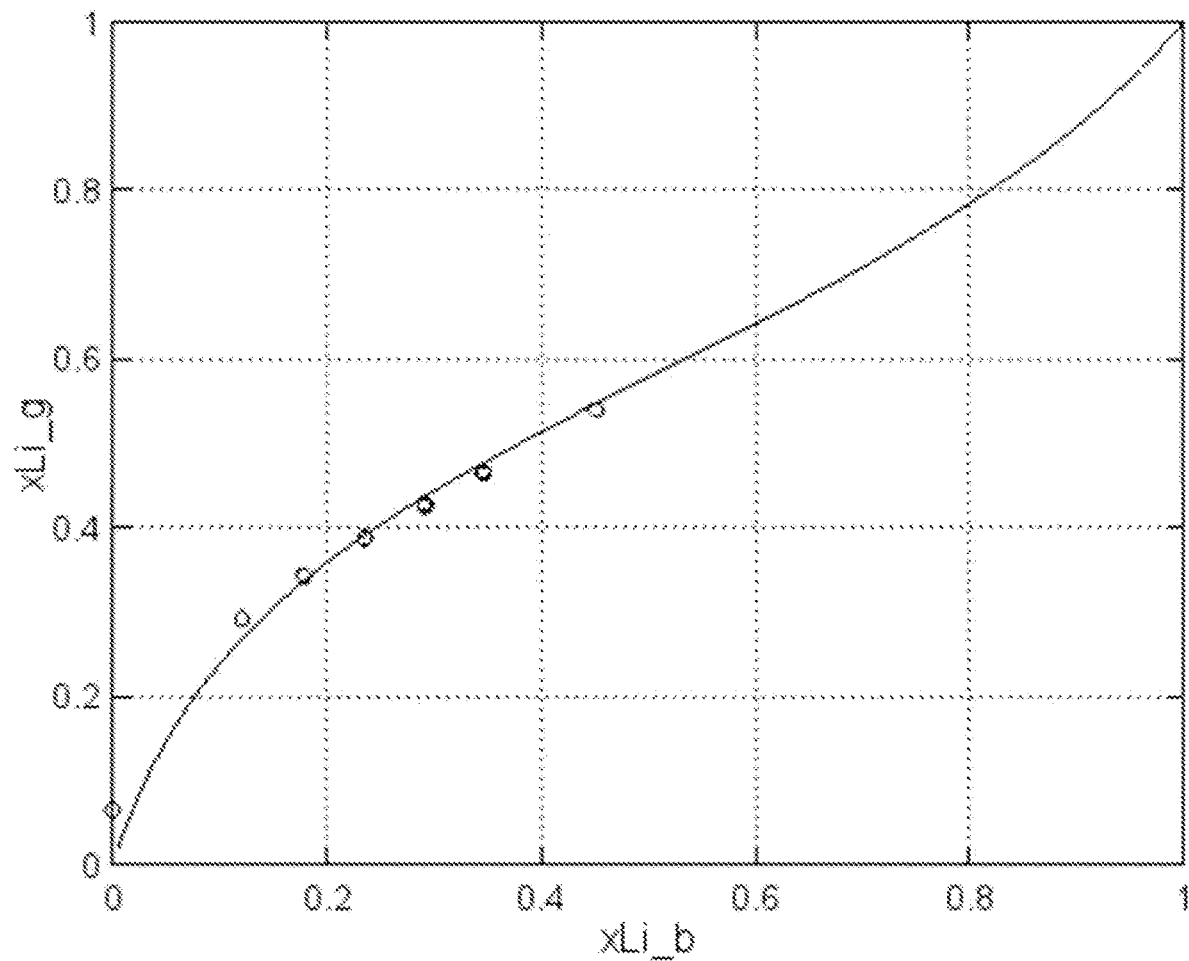
FIG. 4 is xLi_g as a function of xLi_b based on experimental data and a fit to the experimental data.

The reverse ion exchange bath composition may be determined based on the composition of the glass article before ion exchange. The appropriate reverse ion exchange bath composition may be determined based on the desired $Li_2O$ and $Na_2O$ content in the glass article. In particular, xLi_g is the molar fraction of $Li_2O$ with respect to the total amount of $Li_2O$ and $Na_2O$ in the glass prior to ion exchange; and xLi_b is the molar fraction of $LiNO_3$ with respect to the total of $LiNO_3$ and $NaNO_3$ in the reverse ion exchange bath. As shown in FIG. 4, a sigmoidal curve was fit to the average-composition data obtained after interpreting the experimental data of weight changes after ion-exchange presented in FIG. 10. The data points on the curves represent preferable reverse ion exchange bath molar compositions in terms of fraction of Li with respect to the total Li and Na ions, for each target molar composition of the glass, xLi_g. In an example where the target glass composition after reversal of chemical strengthening has xLi_g at about 0.36, the preferred bath composition has xLi_b at about 0.2 (or, in terms of weight, the bath has about 17 wt % $LiNO_3$ and about 83 wt % $NaNO_3$). At the same time, favorable results of repeated chemical strengthening were obtained not only after reverse ion exchange in a bath having 17 wt % $LiNO_3$, but also after reverse ion exchange in a bath having about 12 wt % $LiNO_3$ and about 88 wt % $NaNO_3$. These results demonstrate that it is possible to obtain chemical strengthening that falls within the product target specifications when the bath composition differs by as much as 5 wt % (and similarly, about 5 mol % $LiNO_3$) from the optimum composition when the latter is at about xLi_b=0.2, with target xLi_b approximately equal to 0.36. Given the changes in slope in the curve of FIG. 4, the bath compositions xLi_b recommended for a particular glass composition target xLi_g may be bounded by maximum deviations from the optimum composition that equal about 3 mol % for 0≤xLi_g≤0.2, about 4 mol % for 0.2≤xLi_g≤0.3, about 5 mol % for 0.3≤xLi_g≤0.4, about 6 mol % for 0.4≤xLi_g≤0.8, about 5 mol % for 0.8≤xLi_g≤0.9, and about 4 mol % for 0.9≤xLi_g≤1.0.

The fit in FIG. 4 is described by the following equation for $x_{Li}^g$ expressed in terms of $x_{Li}^b$:

$$x_{Li}^g = 0.5\left(1 \pm \sqrt{1 - \frac{R-1}{pR-1}}\right),$$

where: $p = 1 - \exp\left(\frac{\varepsilon}{kT}\right)$.

In an example, T=693 K, kT=0.05973 eV, and $$\frac{\varepsilon}{kT} \approx -0.9,$$

such that the interaction energy ε is negative, ε≈−0.0574 eV, and p≈0.5934. Such that:

$$R = \left(\frac{K'-1}{K'+1}\right)^2,$$

where: $K' = K_{eq}\frac{x_{Na}^b}{x_{Li}^b}$, and where $K_{eq}$=0.61, and $x_{Li}^b$ and $x_{Na}^b$ are the molar concentrations of $LiNO_3$ and $NaNO_3$ measured relative to the total amount of $LiNO_3$+$NaNO_3$. For the purposes of at least the lithium containing glass composition described in Example 1 below, the optimum composition may be depicted as the curve in FIG. 4, and is defined by the following equations. The following equations are also generally applicable for lithium containing glass compositions similar to the glass composition described in Example 1.

For the present experiment conducted at 420° C., when the target Na in the glass exceeds the target Li in the glass, $x_{Li}^g \leq 0.5$:

$$x_{Li}^b = \frac{0.61}{0.61 + \frac{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} \equiv$$

$$\frac{0.61}{0.61 + \frac{1 + \sqrt{\frac{1 - 4x_{Li}^g x_{Na}^g}{1 - 2.374 x_{Li}^g x_{Na}^g}}}{1 - \sqrt{\frac{1 - 4x_{Li}^g x_{Na}^g}{1 - 2.374 x_{Li}^g x_{Na}^g}}}}.$$

When the target Li in the glass exceeds the target Na in the glass, $x_{Li}^g > 0.5$:

$$x_{Li}^b = \frac{0.61}{0.61 + \frac{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} \equiv$$

$$\frac{0.61}{0.61 + \frac{1 - \sqrt{\frac{1 - 4x_{Li}^g x_{Na}^g}{1 - 2.374 x_{Li}^g x_{Na}^g}}}{1 + \sqrt{\frac{1 - 4x_{Li}^g x_{Na}^g}{1 - 2.374 x_{Li}^g x_{Na}^g}}}}.$$

In the above, the following definitions are employed, the value of kT is expressed in electronvolts (eV), and for the present example the substitution was made kT=0.05973 eV corresponding to the temperature of 420° C.

The molar ratio xLi_b or $x_{Li}^b$ in a salt bath of $LiNO_3$ to the total amount of $LiNO_3$ and $NaNO_3$ is given by:

$$x_{Li}^b = \frac{[Li_2O_3]}{[Li_2O_3] + [Na_2O_3]}.$$

The molar ratio xLi_g or $x_{Li}^g$ in a glass of $Li_2O$ to the total amount of $Li_2O$ and $Na_2O$ is given by:

$$x_{Li}^g = \frac{[Li_2O^g]}{[Li_2O^g] + [Na_2O^g]}.$$

The molar ratio xNa_g or $x_{Na}^g$ in a glass of $Na_2O$ to the total amount of $Na_2O$ and $Li_2O$ is given by:

$$x_{Na}^g = \frac{[Na_2O^g]}{[Li_2O^g] + [Na_2O^g]}.$$

In addition to the above described the above recommended maximum deviations of $x_{Li}^b$ from the optimum values described by the equilibrium curve of FIG. 4, a narrower range where $x_{Li}^b$ is within 2 mol % of the optimum value would be preferred, and in addition, in some cases it may be required that $x_{Li}^b$ be within 1 mol % of the optimum value given by the equilibrium curve and the equations that describe it.

When $0.4 \leq x_{Li}^g \leq 0.5$ the recommended range for $x_{Li}^b$ is:

$$\cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} - 0.06 <$$

$$x_{Li}^b < \cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} + 0.06.$$

When $0.3 \leq x_{Li}^g \leq 0.4$ the recommended range for $x_{Li}^b$ is:

$$\cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} - 0.05 \leq$$

$$x_{Li}^b \leq \cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} + 0.05.$$

When $0.2 \leq x_{Li}^g \leq 0.3$ the recommended range for $x_{Li}^b$ is:

$$\cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} - 0.04 \leq$$

$$x_{Li}^b \leq \cfrac{0.61}{0.61 + \cfrac{1 + \sqrt{\cfrac{1 - 4x_{Li}^g x_{Na}^g}{1 - 2.374 x_{Li}^g x_{Na}^g}}}{1 - \sqrt{\cfrac{1 - 4x_{Li}^g x_{Na}^g}{1 - 2.374 x_{Li}^g x_{Na}^g}}}} + 0.04.$$

In some embodiments, it may be preferred that these ranges for $x_{Li}^b$ are narrower, such as ±0.02, and in some cases, ±0.01, of the optimum value.

Similarly, when the target $x_{Li}^g$ is greater than 0.5, the following are the recommended ranges for $x_{Li}^b$. When $0.5 \leq x_{Li}^g \leq 0.8$, the recommended range for $x_{Li}^b$ is:

$$\cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} - 0.06 \leq$$

$$x_{Li}^b \leq \cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} + 0.06.$$

When, $0.8 \leq x_{Li}^g \leq 0.9$, the recommended range for $x_{Li}^b$ is:

$$\cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} - 0.05 \leq$$

$$x_{Li}^b \leq \cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} + 0.05.$$

When, $0.9 \leq x_{Li}^g \leq 1.0$, $x_{Li}^b$ is chosen to not exceed 1.0, and within the range:

$$\cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} - 0.04 \leq$$

$$x_{Li}^b \leq \cfrac{0.61}{0.61 + \cfrac{1 - \sqrt{\cfrac{1 - 4x_{Li}^g x_{Na}^g}{1 - 2.374 x_{Li}^g x_{Na}^g}}}{1 + \sqrt{\cfrac{1 - 4x_{Li}^g x_{Na}^g}{1 - 2.374 x_{Li}^g x_{Na}^g}}}} + 0.04.$$

In some embodiments, it may be preferred that these ranges for $x_{Li}^b$ are narrower, such as ±0.02, and in some cases, ±0.01, of the optimum value.

More generally, if the reverse ion exchange is performed at a temperature substantially different from 420° C., the molar composition of the bath $x_{Li}^b$ is to be within about $\Delta x_{Li}^b$ of the optimum molar composition, where $\Delta x_{Li}^b$ takes on one of the values 0.06, 0.05, 0.04, 0.03, 0.02, or 0.01 as described above, and when the target glass composition is $x_{Li}^g > 0.5$:

$$\frac{0.61}{0.61 + \frac{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} - \Delta x_{Li}^b \le$$

$$x_{Li}^b \le \frac{0.61}{0.61 + \frac{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} + \Delta x_{Li}^b.$$

When the target glass composition is $x_{Li}^g \le 0.5$:

$$\frac{0.61}{0.61 + \frac{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} - \Delta x_{Li}^b \le$$

$$x_{Li}^b \le \frac{0.61}{0.61 + \frac{1 + \sqrt{\frac{1 - 4x_{Li}^g x_{Na}^g}{1 - 4\left(1 - \exp\left(-\frac{0.0574}{kT}\right)\right)x_{Li}^g x_{Na}^g}}}{1 - \sqrt{\frac{1 - 4x_{Li}^g x_{Na}^g}{1 - 4\left(1 - \exp\left(-\frac{0.0574}{kT}\right)\right)x_{Li}^g x_{Na}^g}}}} + \Delta x_{Li}^b.$$

The reverse ion exchange process may include the reverse ion exchange of the ion exchanged glass article in the reverse ion exchange bath for a time of about 2 hours to about 48 hours; such as about 2 hours to about 24 hours; about 2 hours to about 16 hours; about 4 hours to about 14 hours, about 6 hours to about 12 hours, about 8 hours to about 10 hours, or any sub-ranges contained therein or defined by any of these end points. The reverse ion exchange bath may be at a temperature of about 320° C. to about 520° C.; such as about 320° C. to about 450° C.; about 380° C. to about 420° C., or any sub-ranges contained therein or defined by any of these end points.

In some embodiments, the rework process may include a second reverse ion exchange in a second reverse ion exchange bath. The second reverse ion exchange bath may contain more or less LiNO$_3$ than the first reverse ion exchange bath.

In some embodiments, for example embodiments where the sodium content of the glass article is depleted to a degree that is greater than desired during the first reverse ion exchange process, the second reverse ion exchange bath may include less LiNO$_3$ and more NaNO$_3$ than the first reverse ion exchange bath. In such cases, the second reverse ion exchange bath may comprise less than about 5 wt % LiNO$_3$; such as less than about 4 wt % LiNO$_3$, less than about 3 wt % LiNO$_3$, less than about 2 wt % LiNO$_3$, or any sub-ranges contained therein, with the balance comprising NaNO$_3$ and a possible KNO$_3$ poisoning contribution. The second reverse ion exchange may take place at a temperature of about 320° C. to about 520° C.; such as about 320° C. to about 450° C.; about 380° C. to about 420° C., or any sub-ranges contained therein or defined by any of these end points. The second reverse ion exchange may extend for a period of about 5 minutes to about 30 minutes.

In some embodiments, the second reverse ion exchange bath may contain more LiNO$_3$ than the first reverse ion exchange bath. Such a reverse ion exchange bath may be employed where the lithium content of the glass article before ion exchange would require a LiNO$_3$ content of the reverse ion exchange bath that may produce cracking in the glass article if performed in a single reverse ion exchange process. Employing multiple reverse ion exchange baths allows the content of LiNO$_3$ in subsequent reverse ion exchange baths to be increased until the necessary LiNO$_3$ content to reach the LiO$_2$ content of the original glass article is achieved without cracking the glass article. The temperature of and the time for which the second, and potentially subsequent, reverse ion exchange bath extends may be within the parameters described above for the reverse ion exchange.

The reverse ion exchanged glass article may then be subjected to mechanical polishing or chemical etching to remove material from the surface of the glass article, and any surface defects present at the surface of the reverse ion exchanged glass article. The amount of material removed from the reverse ion exchanged glass article may be in a range of about 1 μm to about 10 μm; such as about 3 μm to about 10 μm, about 5 μm to about 10 μm, or any sub-ranges contained therein. The chemical etching process may be an acid etching process, such as a hydrofluoric acid etching process.

The reverse ion exchanged glass article may be re-ion exchanged in a re-ion exchange bath to produce a re-ion exchanged glass article. The re-ion exchange bath may be the same as the ion exchange bath employed to produce the ion exchanged glass article. Similarly, the re-ion exchanged glass article may be subjected to a second re-ion exchange process in a second re-ion exchange bath. The second re-ion exchange bath may be the same as a second ion exchange bath employed to produce the ion exchanged glass article.

The re-ion exchanged glass article exhibits a buried high index peak. The buried high index peak may indicate the presence of a K$_2$O concentration profile having a portion wherein the K$_2$O concentration increases to a local K$_2$O concentration maximum in the re-ion exchanged glass article. The local K$_2$O concentration maximum may be located at a depth below a surface of the re-ion exchanged glass article of about 3 μm to about 30 μm. The K$_2$O concentration at the local maximum may be about 0.05 mol % to about 1.2 mol %, and may be about 0.5% to about 15% of the starting surface K$_2$O concentration of the ion exchanged glass article. The re-ion exchanged glass article may have a K$_2$O concentration of about 0.5% to about 20% of the K$_2$O concentration of the ion exchanged glass article at a depth below a surface of the re-ion exchanged glass article of 10 μm. In some embodiments, the re-ion exchanged glass article may have a K$_2$O concentration at a depth below a surface of 10 μm of at least about 0.3 mol % greater than the K$_2$O concentration at the center of the re-ion exchanged glass article; such as 0.5 mol % greater; 1 mol % greater; 1.5 mol % greater; 2 mol % greater, or more.

In one or more embodiments, the alkali aluminosilicate glass articles have a homogenous microstructure (i.e., the glass is not phase separated). In one or more embodiments, the alkali aluminosilicate glass article is amorphous. As used herein, "amorphous" when used to describe glass article means substantially free of crystallites or crystalline phases (i.e., containing less than 1 vol % crystallites or crystalline phases).

The alkali aluminosilicate glass articles described herein may be formed from glass compositions that are fusion formable. In one or more embodiments, the fusion formable glass composition may have a liquidus viscosity greater than about 200 kilopoise (kP) and, in some embodiments, having a liquidus viscosity of at least about 600 kP. In some embodiments, these glass articles and compositions are compatible with a zircon isopipe: the viscosity at which the glass breaks down the zircon isopipe to create zirconia defects is less than 35 kP. Selected glass compositions within the composition ranges described herein may have a zircon breakdown viscosity that is greater than 35 kP. In such instances, an alumina isopipe may be used to fusion form these glass articles.

In one or more embodiments, the alkali aluminosilicate glass articles may include a glass composition that comprises at least 0.5 mol % $P_2O_5$, $Na_2O$ and $Li_2O$. In some embodiments, $Li_2O$ (mol %)/$Na_2O$ (mol %) may be less than 1. In addition, these glasses may be free of $B_2O_3$ and $K_2O$. The alkali aluminosilicate glasses described herein may further include ZnO, MgO, and $SnO_2$.

In some embodiments, the alkali aluminosilicate glass article comprises or consists essentially of at least about 58 mol % $SiO_2$, from about 0.5 mol % to about 3 mol % $P_2O_5$, at least about 11 mol % $Al_2O_3$, $Na_2O$ and $Li_2O$.

In one or more embodiments, the alkali aluminosilicate glass article comprises or consists essentially of from about 58 mol % to about 65 mol % $SiO_2$; from about 11 mol % to about 20 mol % $Al_2O_3$; from about 0.5 mol % to about 3 mol % $P_2O_5$; from about 6 mol % to about 18 mol % $Na_2O$; from about 0.1 mol % to 10 mol % $Li_2O$; from 0 mol % to about 6 mol % MgO; and from 0 mol % to about 6 mol % ZnO. In certain embodiments, the glass comprises or consists essentially of from about 63 mol % to about 65 mol % $SiO_2$; from 11 mol % to about 19 mol % $Al_2O_3$; from about 1 mol % to about 3 mol % $P_2O_5$; from about 9 mol % to about 20 mol % $Na_2O$; from about 2 mol % to about 10 mol % $Li_2O$; from 0 mol % to about 6 mol % MgO; and from 0 mol % to about 6 mol % ZnO.

In one or more embodiments, the alkali aluminosilicate glass article comprises the ratio $R_2O$ (mol %)/$Al_2O_3$ (mol %) that is less than about 2 (e.g., less than about 1.8, less than about 1.6, less than about 1.5, or less than about 1.4), where $R_2O=Li_2O+Na_2O$.

In one or more embodiments, the alkali aluminosilicate glass article comprises the relationship where the total amount of $SiO_2$ and $P_2O_5$ that is greater than 65 mol % and less than 67 mol % (i.e., 65 mol %<$SiO_2$ (mol %)+$P_2O_5$ (mol %)<67 mol %). For example, the total amount of $SiO_2$ and $P_2O_5$ may be in a range from about 65.1 mol % to about 66.9 mol %, from about 65.2 mol % to about 66.8 mol %, from about 65.3 mol % to about 66.7 mol %, from about 65.4 mol % to about 66.6 mol %, from about 65.5 mol % to about 66.5 mol %, from about 65.6 mol % to about 66.4 mol %, about 65.7 mol % to about 66.3 mol %, from about 65.8 mol % to about 66.2 mol %, from about 65.9 mol % to about 66.1 mol %, or any sub-ranges contained therein or formed from any of these endpoints.

In one or more embodiments, the alkali aluminosilicate glass article comprises a relationship $R_2O$ (mol %)+R'O (mol %)-$Al_2O_3$ (mol %)+$P_2O_5$ (mol %) that is greater than about −3 mol % (i.e., $R_2O$ (mol %)+R'O (mol %)-$Al_2O_3$ (mol %)+$P_2O_5$ (mol %)>−3 mol %). In one or more embodiments, $R_2O$ is the total amount of $Li_2O$ and $Na_2O$ (i.e., $R_2O=Li_2O+Na_2O$). In one or more embodiments, R'O is the total amount of divalent metal oxides present in the alkali aluminosilicate glass. In one or more embodiments, the relationship $R_2O$ (mol %)+R'O (mol %)-$Al_2O_3$ (mol %)+$P_2O_5$ (mol %) that is greater than about −2.5 mol %, greater than about −2 mol %, greater than about −1.5 mol %, greater than about −1 mol %, greater than about −0.5 mol %, greater than about 0 mol %, greater than about 0.5 mol %, greater than about 1 mol %, greater than about 1.5 mol %, greater than about 2 mol %, greater than about 2.5 mol %, greater than about 3 mol %, greater than about 3.5 mol %, greater than about 4 mol %, greater than about 4.5 mol %, greater than about 5 mol %, greater than about 5.5 mol %, or greater than about 6 mol %, greater than about 6.5 mol %, greater than about 7 mol %, greater than about 7.5 mol %, greater than about 8 mol %, greater than about 8.5 mol %, greater than about 9 mol %, or greater than about 9.5 mol %.

Each of the oxide components of the base (or unstrengthened) and strengthened (i.e., chemically strengthened by ion exchange) alkali aluminosilicate glass articles described herein serves a function and/or has an effect on the manufacturability and physical properties of the glass. Silica ($SiO_2$), for example, is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In one or more embodiments, the alkali aluminosilicate glass article comprises $SiO_2$ in an amount in a range from about 58 mol % to about 65 mol %, from about 59 mol % to about 64 mol %, from about 60 mol % to about 63 mol %, from about 61 mol % to about 62 mol %, from about 63.2 mol % to about 65 mol %, from about 63.3 mol % to about 65 mol %, or any sub-ranges contained therein or formed from any of these endpoints.

In addition to silica, the alkali aluminosilicate glass articles described herein comprise the network former $Al_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination, which increases the packing density of the glass network and thus increases the compressive stress resulting from chemical strengthening. In one or more embodiments, the alkali aluminosilicate glass article comprises $Al_2O_3$ in an amount in a range from about 11 mol % to about 20 mol %, from about 12 mol % to about 19 mol %, from about 13 mol % to about 18 mol %, from about 14 mol % to about 17 mol %, from about 15 mol % to about 16 mol %, or any sub-ranges contained therein or formed from any of these endpoints.

Phosphorous pentoxide ($P_2O_5$) is a network former incorporated in the alkali aluminosilicate glass articles described herein. $P_2O_5$ adopts a quasi-tetrahedral structure in the glass network; i.e., it is coordinated with four oxygen atoms, but only three of which are connected to the rest of the network. The fourth oxygen atom is a terminal oxygen that is doubly bound to the phosphorous cation. The incorporation of $P_2O_5$ in the glass network is highly effective at reducing Young's modulus and shear modulus. Incorporating $P_2O_5$ in the glass network also reduces the high temperature CTE, increases the ion-exchange interdiffusion rate, and improves glass compatibility with zircon refractory materials. In one or more embodiments, the alkali aluminosilicate glass article comprises $P_2O_5$ in an amount in a range from about 0.5 mol % to about 5 mol %, from about 0.6 mol % to about 5 mol %, from about 0.8 mol % to about 5 mol %, from about 1 mol % to about 5 mol %, from about 1.2 mol % to about 5 mol %, from about 1.4 mol % to about 5 mol %, from about 1.5 mol % to about 5 mol %, from about 1.6 mol % to about 5 mol %, from about 1.8 mol % to about 5 mol %, from about 2 mol % to about 5 mol %, from about 0.5 mol % to about 3 mol %, from about 0.5 mol % to about 2.8 mol %, from about 0.5 mol % to about 2.6 mol %, from about 0.5 mol % to about 2.5 mol %, from about 0.5 mol % to about 2.4 mol %, from about 0.5 mol % to about 2.2 mol %, from about 0.5 mol % to about 2 mol %, from about 2.5 mol % to about 5 mol %, from about 2.5 mol % to about 4 mol %, from about 2.5 mol % to about 3 mol %, or any sub-ranges contained therein or formed from any of these endpoints.

The alkali aluminosilicate glass articles described herein described herein may be free of $B_2O_3$, as its presence has a negative impact on compressive stress when the glass is strengthened by ion exchange. As used herein, the phrase "free of $B_2O_3$" means the alkali aluminosilicate glass articles described herein include less than about 0.1 mol % $B_2O_3$, less than about 0.05 mol % $B_2O_3$ or less than about 0.01 mol %. In some embodiments, the alkali aluminosilicate glass articles may include $B_2O_3$ in an amount of about 0.1 mol % up to about 10 mol %; such as about 0.5 mol % up to about 9 mol %; about 1 mol % up to about 8 mol %; about 2 mol % up to about 7 mol %; about 3 mol % up to about 6 mol %; about 4 mol % up to about 5 mol %, or any sub-ranges contained therein or formed from any of these endpoints.

The alkali oxide $Na_2O$ is used to achieve chemical strengthening of the alkali aluminosilicate glass articles described herein by ion exchange. The alkali aluminosilicate glass articles described herein include $Na_2O$, which provides the Na+ cation to be exchanged for potassium cations present in a salt bath containing, for example, $KNO_3$. In some embodiments, the alkali aluminosilicate glass articles described herein comprise from about 4 mol % to about 20 mol % $Na_2O$. In one or more embodiments, the alkali aluminosilicate glass article comprises $Na_2O$ in an amount in a range from about 4.5 mol % to about 19.5 mol %, from about 5 mol % to about 19 mol %, from about 5.5 mol % to about 18.5 mol %, from about 6 mol % to about 18 mol %, from about 6.5 mol % to about 17.5 mol %, from about 7 mol % to about 17 mol %, from about 7.5 mol % to about 16.5 mol %, from about 8 mol % to about 16 mol %, from about 8.5 mol % to about 15.5 mol %, from about 9 mol % to about 15 mol %, from about 9.5 mol % to about 14.5 mol %, from about 10 mol % to about 14 mol %, from about 10.5 mol % to about 13.5 mol %, from about 11 mol % to about 13 mol %, from about 11.5 mol % to about 12.5 mol %, or any sub-ranges contained therein or formed from any of these endpoints.

The alkali aluminosilicate glass articles described herein contain $Li_2O$. In some embodiments, further include up to about 13 mol % $Li_2O$ or up to about 10 mol % $Li_2O$. In some embodiments, the alkali aluminosilicate glass articles comprise $Li_2O$ in an amount in a range from about 0.1 mol % to about 10 mol %, from about 0.5 mol % to about 9.5 mol %, from about 1 mol % to about 9 mol %, from about 1.5 mol % to about 8.5 mol %, from about 2 mol % to about 8 mol %, from about 2.5 mol % to about 7.5 mol %, from about 3 mol % to about 7 mol %, from about 3.5 mol % to about 6.5 mol %, from about 4 mol % to about 6 mol %, from about 4.5 mol % to about 5.5 mol %, or from about 4 mol % to about 8 mol %, or any sub-ranges contained therein or formed from any of these endpoints. When substituted for $Na_2O$, $Li_2O$ reduces the zircon breakdown temperature and softens the glass, which allows additional $Al_2O_3$ to be added to the glass. In the alkali aluminosilicate glass articles described herein, the amount of $Na_2O$ present may exceed that of $Li_2O$, where $Li_2O$ (mol %)/$Na_2O$ (mol %)<1. In some embodiments, $Li_2O$ (mol %)/$Na_2O$ (mol %)<0.75. In some embodiments, $R_2O$ (mol %)/$Al_2O_3$ (mol %)<2, and, in some embodiments, $0.9 \leq R_2O$ (mol %)/$Al_2O_3$ (mol %)$\leq 1.6$, where $R_2O = Li_2O + Na_2O$.

The presence of potassium oxide in the glass has a negative effect on the ability of to achieve high levels of surface compressive stress in the glass through ion exchange. The alkali aluminosilicate glass articles described herein, as originally formed, may be free of $K_2O$. In one or more embodiments, the alkali aluminosilicate glass articles include less than about 0.2 mol % $K_2O$. However, when ion exchanged in a potassium-containing molten salt (e.g., containing $KNO_3$) bath, the alkali aluminosilicate glasses may include some amount of $K_2O$ (i.e., less than about 1 mol %), with the actual amount depending upon ion exchange conditions (e.g., potassium salt concentration in the ion exchange bath, bath temperature, ion exchange time, and the extent to which $K^+$ ions replace $Li^+$ and $Na^+$ ions). The resulting compressive layer will contain potassium—the ion-exchanged layer near the surface of the glass may contain 10 mol % or more $K_2O$ at the glass surface, while the bulk of the glass at depths greater than the depth of the compressive layer remains essentially potassium-free.

In some embodiments, the alkali aluminosilicate glass articles described herein may comprise from 0 mol % up to about 6 mol % ZnO, such as from about 0.5 mol % to about 5.5 mol %, from about 1 mol % to about 5 mol %, from about 1.5 mol % to about 4.5 mol %, from about 2 mol % to about 4 mol %, from about 2.5 mol % to about 3.5 mol %, from about 0.1 mol % to about 6 mol %, from about 0.1 mol % to about 3 mol %, or any sub-ranges contained therein or formed from any of these endpoints. The divalent oxide ZnO improves the melting behavior of the glass by reducing the temperature at 200 poise viscosity (200P temperature). ZnO also is beneficial in improving the strain point when compared to like additions of $P_2O_5$, and/or $Na_2O$.

Alkaline earth oxides such as MgO and CaO, may also be substituted for ZnO to achieve a similar effect on the 200P temperature and strain point. When compared to MgO and CaO, however, ZnO is less prone to promoting phase separation in the presence of $P_2O_5$. In some embodiments, the glasses described herein include from 0 mol % up to 6 mol % MgO or, in other embodiments, these glasses comprise from 0.02 mol % to about 6 mol % MgO. While other alkaline earth oxides, including SrO and BaO, may also be substituted for ZnO, they are less effective in reducing the melt temperature at 200 poise viscosity than ZnO, MgO, or CaO and are also less effective than ZnO, MgO, or CaO at increasing the strain point.

In some embodiments, the alkali aluminosilicate glass articles described herein are formable by down-draw processes that are known in the art, such as slot-draw and fusion-draw processes. The lithium may be batched in the melt as either spodumene or lithium carbonate.

The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, mobile phones, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass composition must have a sufficiently high liquidus viscosity (i.e., the viscosity of a molten glass at the liquidus temperature). In some embodiments, compositions used to form the alkali aluminosilicate glass articles described herein have a liquidus viscosity of at least about 200 kilopoise (kP) and, in other embodiments, at least about 600 kP.

After the alkali aluminosilicate glass articles are formed, the article is chemically strengthened. Ion exchange is widely used to chemically strengthen glasses. In one particular example, alkali cations within a source of such cations (e.g., a molten salt, or "ion exchange," bath) are exchanged with smaller alkali cations within the glass to achieve a layer that is under a compressive stress near the surface of the glass article. The compressive layer extends from the surface to a DOC within the glass article. In the alkali aluminosilicate glass articles described herein, for example, potassium ions from the cation source are exchanged for sodium ions within the glass during ion exchange by immersing the glass in a molten salt bath comprising a potassium salt such as, but not limited to, potassium nitrate ($KNO_3$). Other potassium salts that may be used in the ion exchange process include, but are not limited to, potassium chloride (KCl), potassium sulfate ($K_2SO_4$), combinations thereof, and the like. The ion exchange baths described herein may contain alkali ions other than potassium and the corresponding salts. For example, the ion exchange bath may also include sodium salts such as sodium nitrate ($NaNO_3$), sodium sulfate, sodium chloride, or the like. In one or more embodiments, a mixture of two different salts may be utilized. For example, the glass articles may be immersed in a salt bath of $KNO_3$ and $NaNO_3$. In some embodiments, more than one bath may be used with the glass being immersed in one bath followed by another, successively. The baths may have the same or different compositions, temperatures and/or may be used for different immersion times.

The ion exchange bath may have a temperature in the range from about 320° C. to about 520° C., such as from about 320° C. to about 450° C. Immersion time in the bath may vary from about 15 minutes to about 48 hours, such as from about 15 minutes to about 16 hours. In some embodiments, the ion exchange bath may comprise about 15 wt % to about 40 wt % $NaNO_3$; and about 60 wt % to about 85 wt % $KNO_3$.

While the embodiment shown in FIG. 1 depicts a strengthened alkali aluminosilicate glass article 100 as a flat planar sheet or plate, the alkali aluminosilicate glass article may have other configurations, such as three dimensional shapes or non-planar configurations. The strengthened alkali aluminosilicate glass article 100 has a first surface 110 and a second surface 112 defining a thickness t. In one or more embodiments, (such as the embodiment shown in FIG. 1) the strengthened alkali aluminosilicate glass article is a sheet including first surface 110 and opposing second surface 112 defining thickness t. The strengthened alkali aluminosilicate glass article 100 has a first compressive layer 120 extending from first surface 110 to a depth of layer $d_1$ into the bulk of the glass article 100. In the embodiment shown in FIG. 1, the strengthened alkali aluminosilicate glass article 100 also has a second compressive layer 122 extending from second surface 112 to a second depth of layer $d_2$. Glass article also has a central region 330 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the strengthened alkali aluminosilicate glass article 100 from the propagation of flaws introduced by sharp impact to first and second surfaces 110, 112 of the strengthened alkali aluminosilicate glass article 100, while the compressive stress minimizes the likelihood of a flaw penetrating through the depth $d_1$, $d_2$ of first and second compressive layers 120, 122. DOC d1 and DOC d2 may be equal to one another or different from one another. In some embodiments, at least a portion of the central region (e.g., the portion extending from the DOC to a depth equal to 0.5 times the thickness of the article) may be free of $K_2O$ (as defined herein).

The DOC may be described as a fraction of the thickness t. For example, in one or more embodiments, the DOC may be equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, the DOC may be in a range from about 0.08t to about 0.25t, from about 0.09t to about 0.24t, from about 0.10t to about 0.23t, from about 0.11t to about 0.22t, from about 0.12t to about 0.21t, from about 0.13t to about 0.20t, from about 0.14t to about 0.19t, from about 0.15t to about 0.18t, from about 0.16t to about 0.19t, or any sub-ranges contained therein or formed from any of these endpoints. In some instances, the DOC may be about 20 μm or less. In one or more embodiments, the DOC may be about 40 μm or greater, such as from about 40 μm to about 300 μm, from about 50 μm to about 280 μm, from about 60 μm to about 260 μm, from about 70 μm to about 240 μm, from about 80 μm to about 220 μm, from about 90 μm to about 200 μm, from about 100 μm to about 190 μm, from about 110 μm to about 180 μm, from about 120 μm to about 170 μm, from about 140 μm to about 160 μm, from about 150 μm to about 300 μm, or any sub-ranges contained therein or formed from any of these endpoints.

In one or more embodiments, the strengthened alkali aluminosilicate glass article may have a maximum compressive stress (which may be found at the surface or a depth within the glass article) of about 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened alkali aluminosilicate glass article may have a maximum tensile stress or central tension (CT) of about 40 MPa or greater; such as about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

The alkali aluminosilicate glass articles described herein are, in some embodiments, ion-exchanged by immersion in a molten salt bath comprising or consisting essentially of about 100% $KNO_3$ by weight (small amounts of additives such as silicic acid or the like may be added to the bath). In order to maximize the surface compressive stress, the glasses may undergo a heat treatment followed by ion exchange.

In some embodiments, the ion exchanged glass articles may include large ions, such as silver, copper, cesium, or rubidium. The content of these large ions in the ion exchanged glass article may be up to about 5 mol %, such as up to about 3 mol %. In some embodiments, the re-ion exchange bath may include salts of the large ions, such that the large ions are re-ion exchanged into the reverse ion exchanged glass article as part of the rework process.

Figure 5:
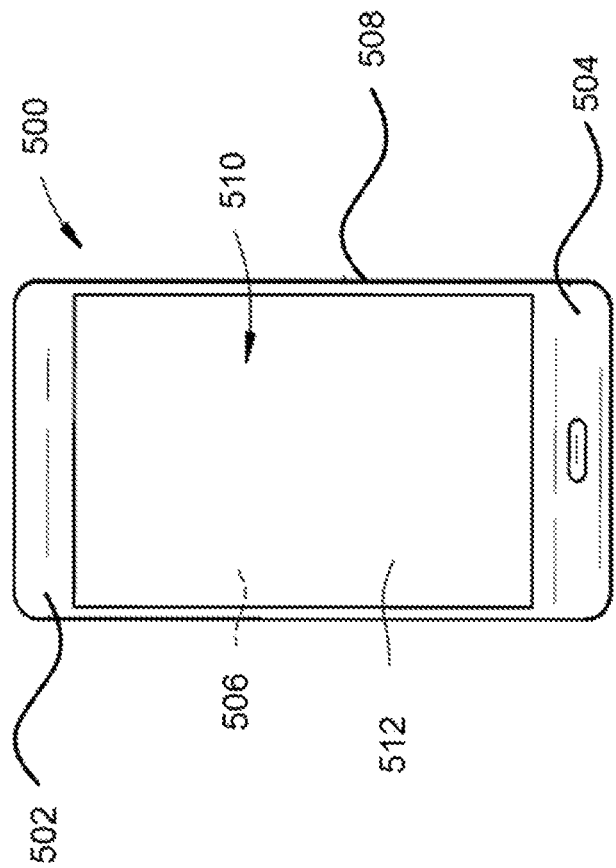
FIG. 5 is schematic, front plan view of a consumer electronic product including one or more embodiments of the alkali aluminosilicate glass articles described herein.
Figure 6:
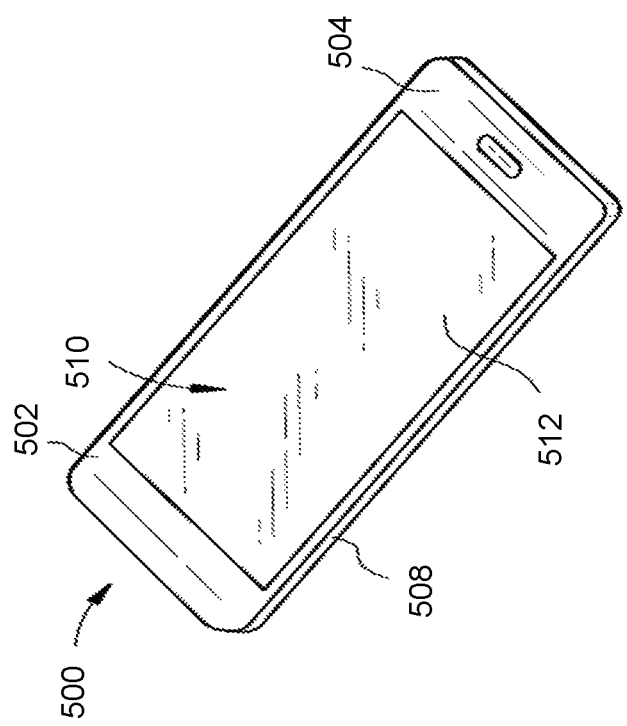
FIG. 6 is a schematic, prospective view of the consumer electronic product of FIG. 5.

In some embodiments, the alkali aluminosilicate glass articles described herein form a portion of a consumer electronic product, such as a cellular phone or smart phone, laptop computers, tablets, or the like. A schematic view of a consumer electronic product (e.g., a smart phone) is shown in FIGS. 5 and 6. A consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In some embodiments, the cover substrate 512 may include any of the strengthened articles disclosed herein.

EXEMPLARY EMBODIMENTS

Example 1

Figure 7:
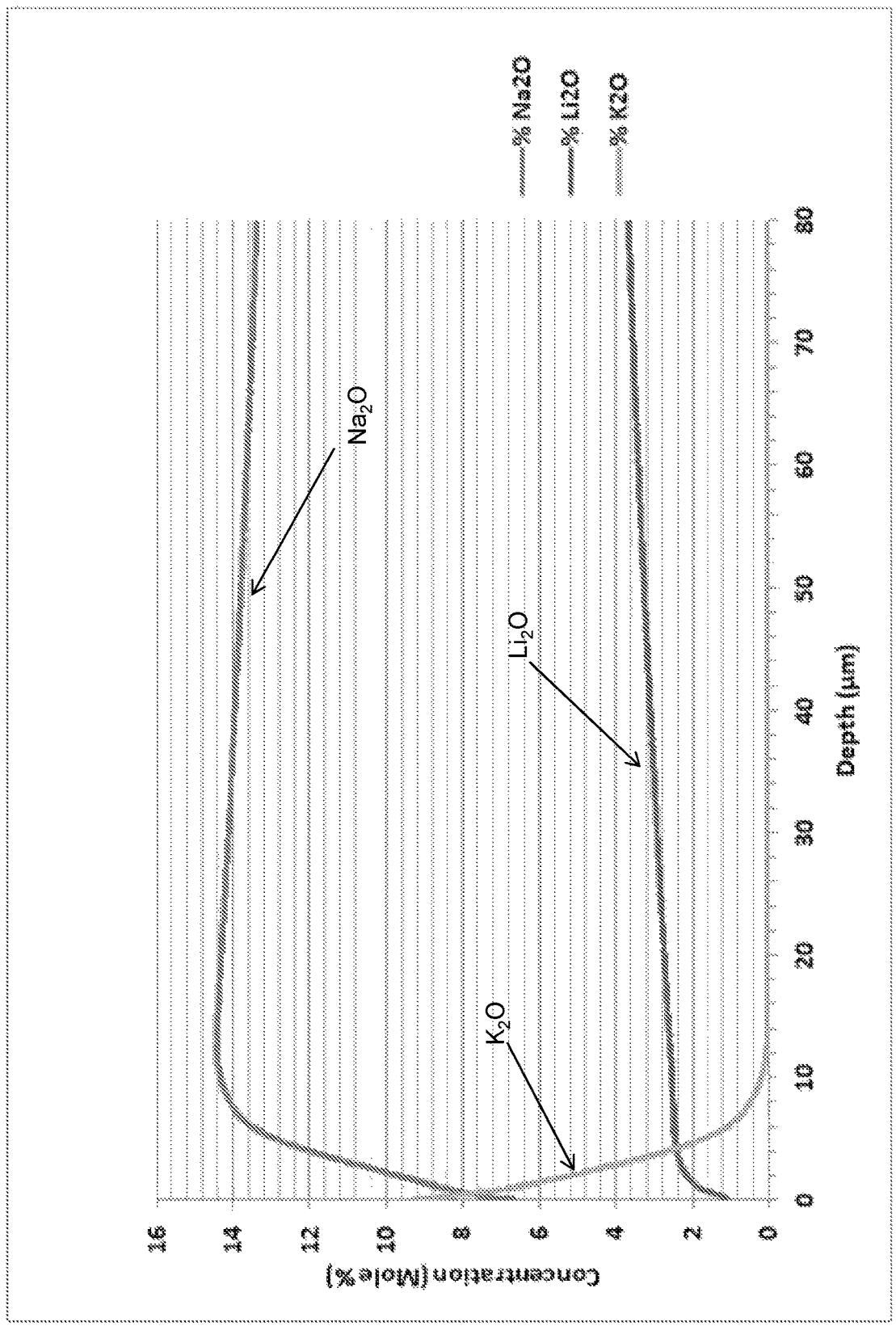
FIG. 7 is a plot of oxide concentration as a function of depth in an ion exchanged glass article.

A 0.8 mm thick glass article having a composition of 64.13 mol % $SiO_2$, 15.98 mol % $Al_2O_3$, 1.24 mol % $P_2O_5$, 6.41 mol % $Li_2O$, 10.86 mol % $Na_2O$, 0.03 mol % $K_2O$, 1.17 mol % ZnO, 0.05 mol % $SnO_2$, 0.08 mol % MgO, 0.02 mol % CaO, and 0.02 mol % $Fe_2O_3$ was ion exchanged in a dual ion exchange process. The dual ion exchange process included a first and second ion exchange, where the first ion exchange included a bath containing 75 wt % $NaNO_3$ and 25 wt % $KNO_3$ at a temperature of 380° C. for 3 hours and 30 minutes. The second ion exchange included a bath containing 5 wt % $NaNO_3$ and 95 wt % $KNO_3$ at a temperature of 380° C. for 30 minutes. The resulting concentrations of $Li_2O$, $Na_2O$, and $K_2O$ as measured by glow discharge optical emission spectroscopy (GDOES) as a function of depth beneath a surface of the glass article are shown in FIG. 7.

Figure 8:
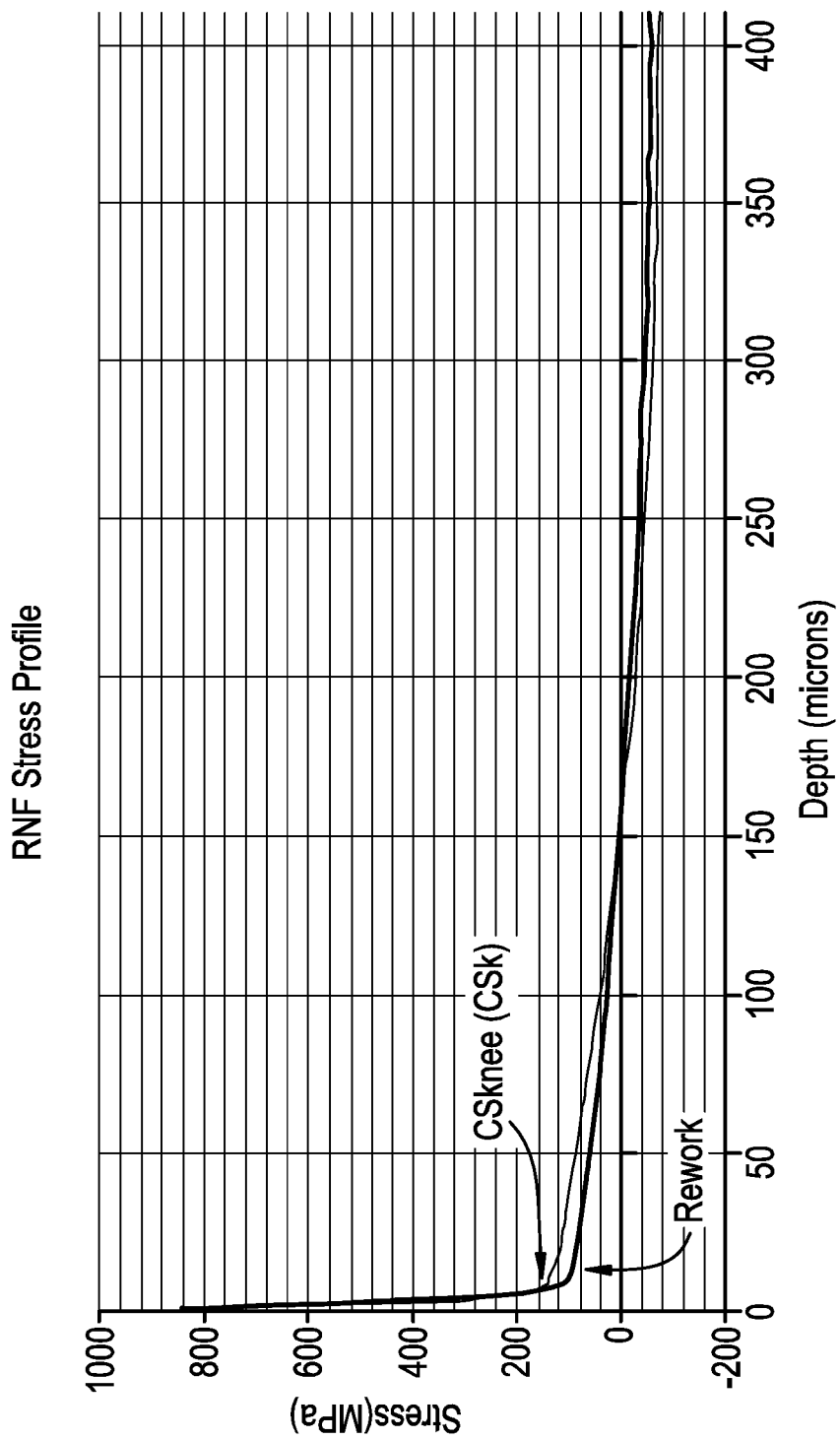
FIG. 8 is a plot of stress as a function of depth in an ion exchanged glass article and a polished and re-ion exchanged glass article.

The ion exchanged glass article was polished to remove 7 μm from the surface thereof. The polished ion exchanged glass article was then ion exchanged in an ion exchange bath including 9 wt % $NaNO_3$ and 91 wt % $KNO_3$ to recover a desired surface compressive stress (CS) and depth of compression (DOC). The stress profiles of the ion exchanged glass article and the polished and ion exchanged glass article are shown in FIG. 8. The compressive stress at the knee of the stress profile (CSk) was reduced by about 50 MPa in the polished and ion exchanged glass article in comparison to the ion exchanged glass article that was not polished. The stress profile in FIG. 8 was measured by the Refracted near-field (RNF) method. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Figure 9:
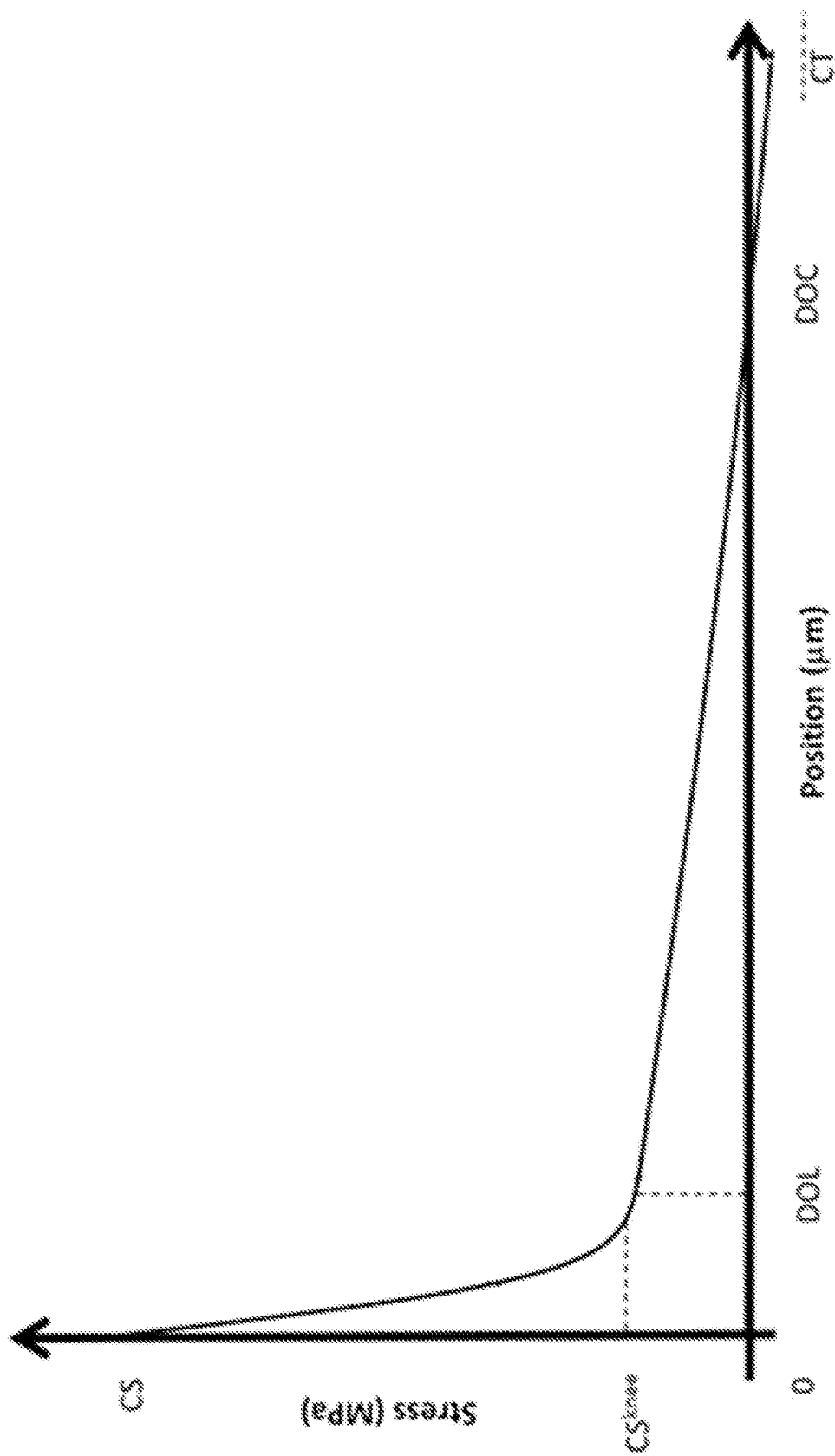
FIG. 9 is a representation of stress as a function of depth for a theoretical ion exchanged glass.

FIG. 9 further illustrates the concept of CSk. As shown in FIG. 9, CSk is the compressive stress at the transition between the "spike" portion of the stress profile and the deeper diffusion region of the stress profile. The DOC and potassium DOL are also shown in FIG. 9, with the potassium DOL labeled as DOL.

Figure 10:
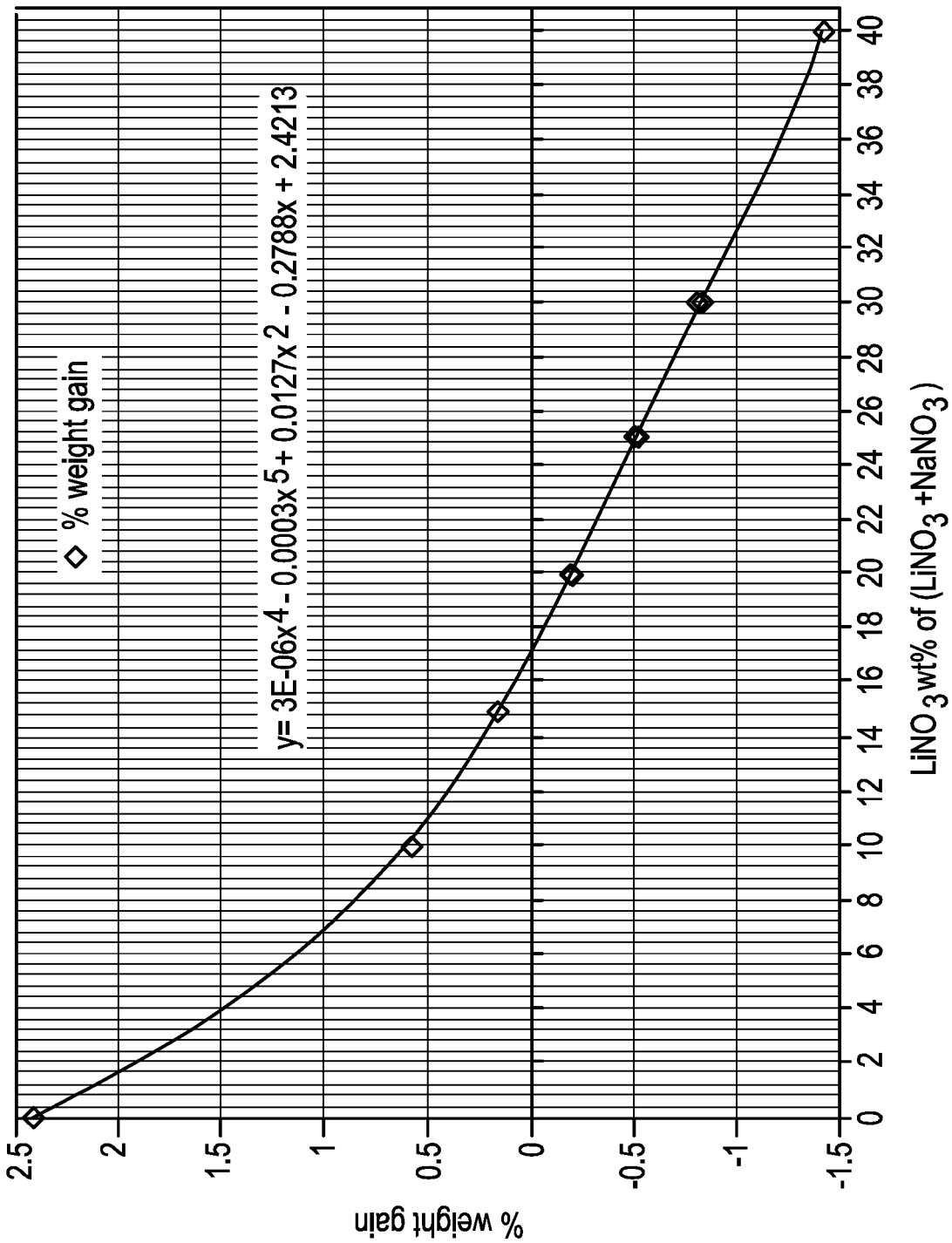
FIG. 10 is percent weight gain for a glass article when allowed to reach equilibrium in a variety of $LiNO_3$ containing ion exchange baths.

A non-ion exchanged glass article with the above described glass composition was allowed to reach equilibrium in a variety of reverse ion exchange baths containing $LiNO_3$. The weight gain as a percentage of the original glass article weight was then calculated based on the ratio of $LiNO_3$ to $LiNO_3+NaNO_3$ in the bath as shown in FIG. 10. The line fit to the measured data indicates that an ideal reverse ion exchange bath that exhibits no weight gain would contain about 17 wt % $LiNO_3$ and 83 wt % $NaNO_3$, as shown in FIG. 10.

Figure 11:
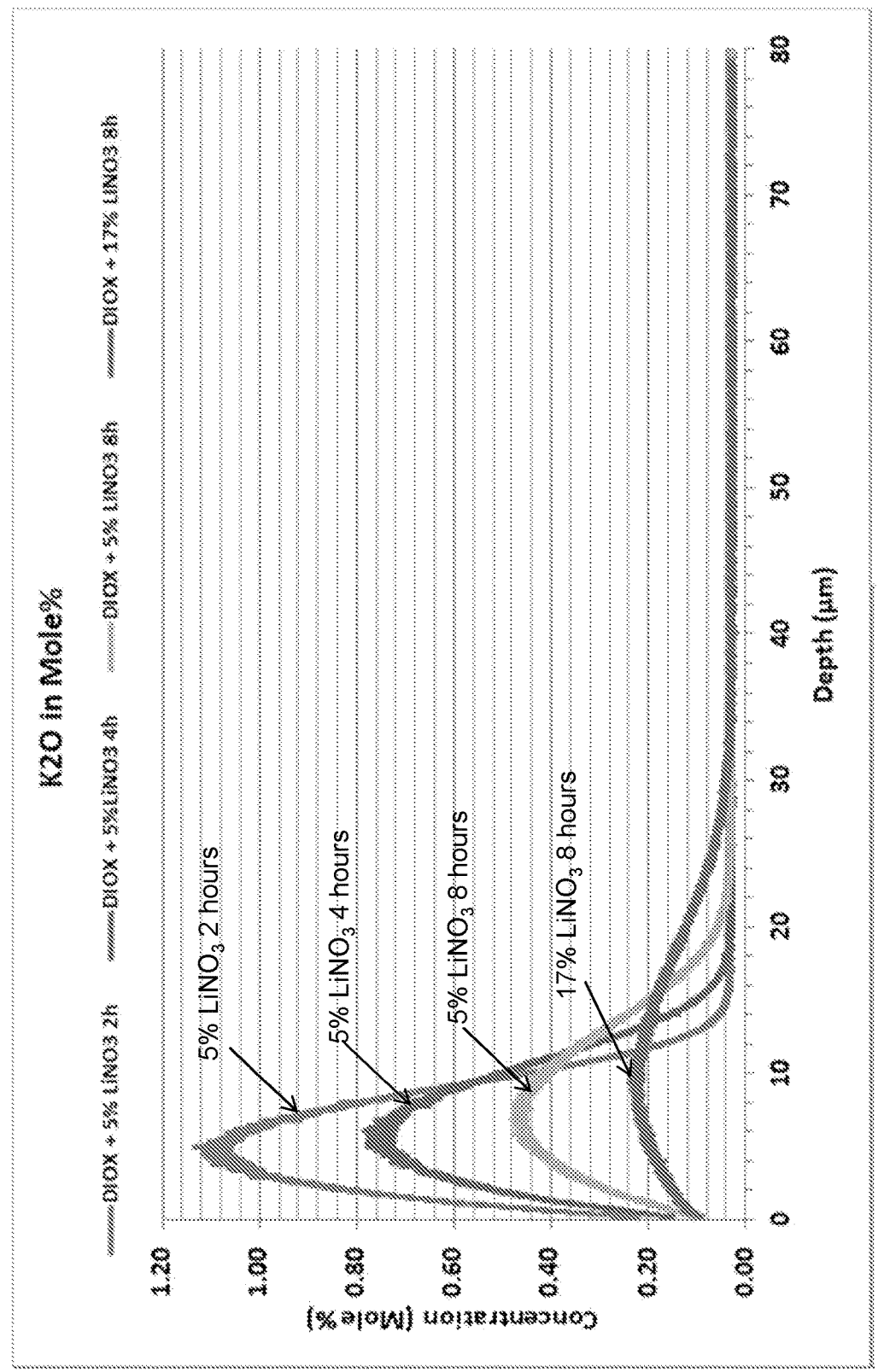
FIG. 11 is $K_2O$ concentration as a function of depth in a glass article after a dual ion exchange process and a variety of reverse ion exchange processes.
Figure 12:
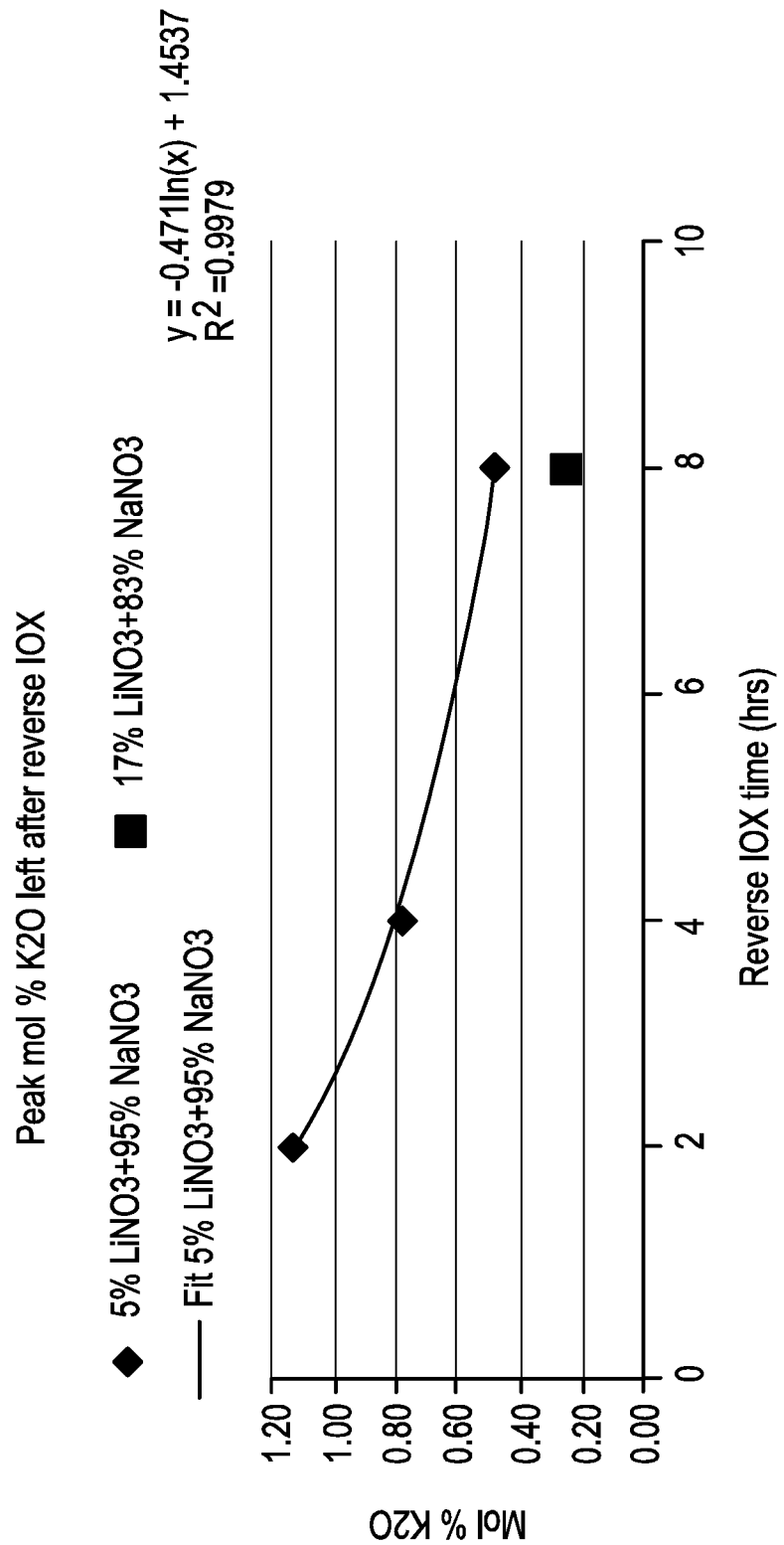
FIG. 12 is the peak $K_2O$ concentration as a function of reverse ion exchange time for a variety of reverse ion exchange baths.
Figure 13:
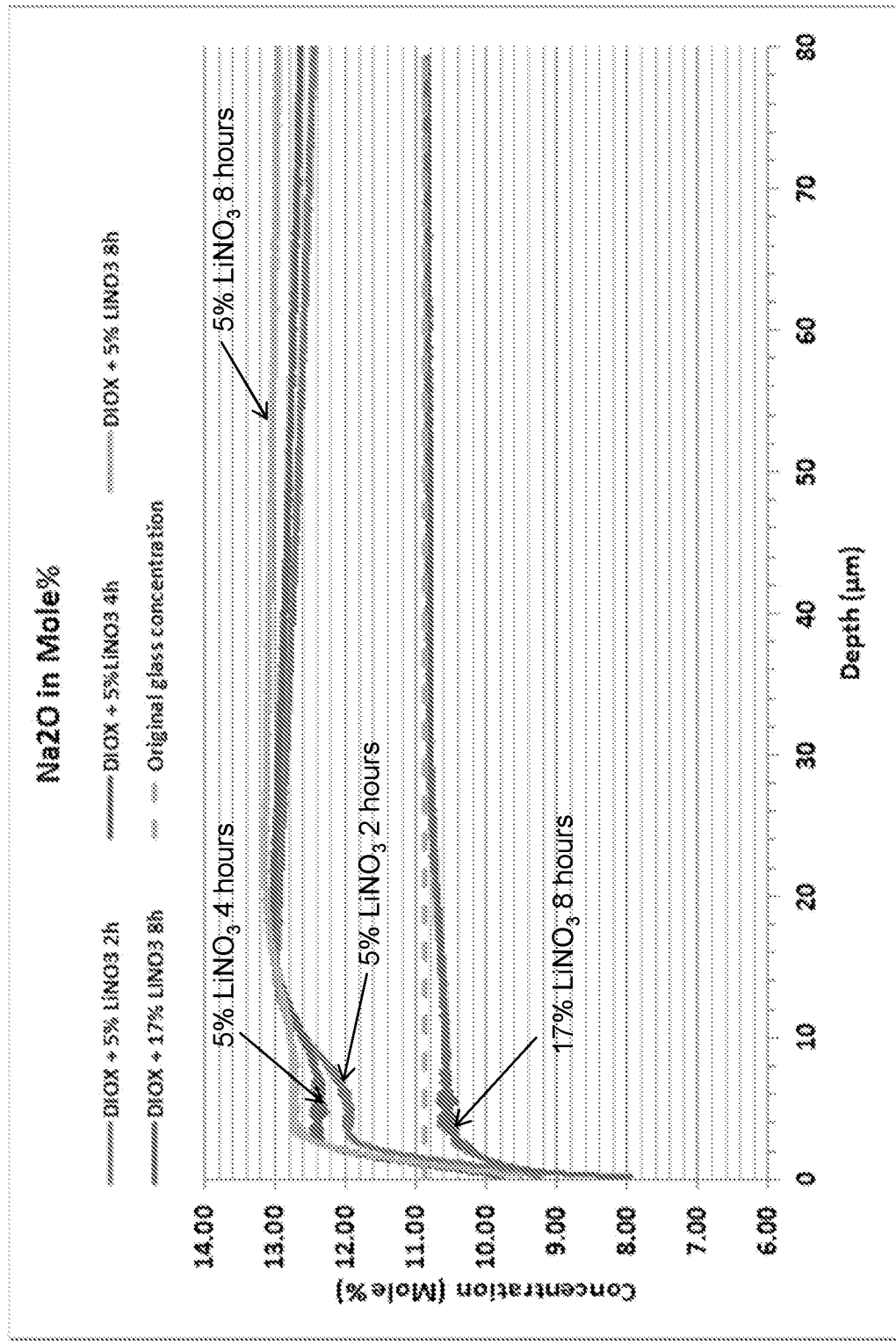
FIG. 13 is $Na_2O$ concentration as a function of depth in a glass article after a dual ion exchange process and a variety of reverse ion exchange processes.
Figure 14:
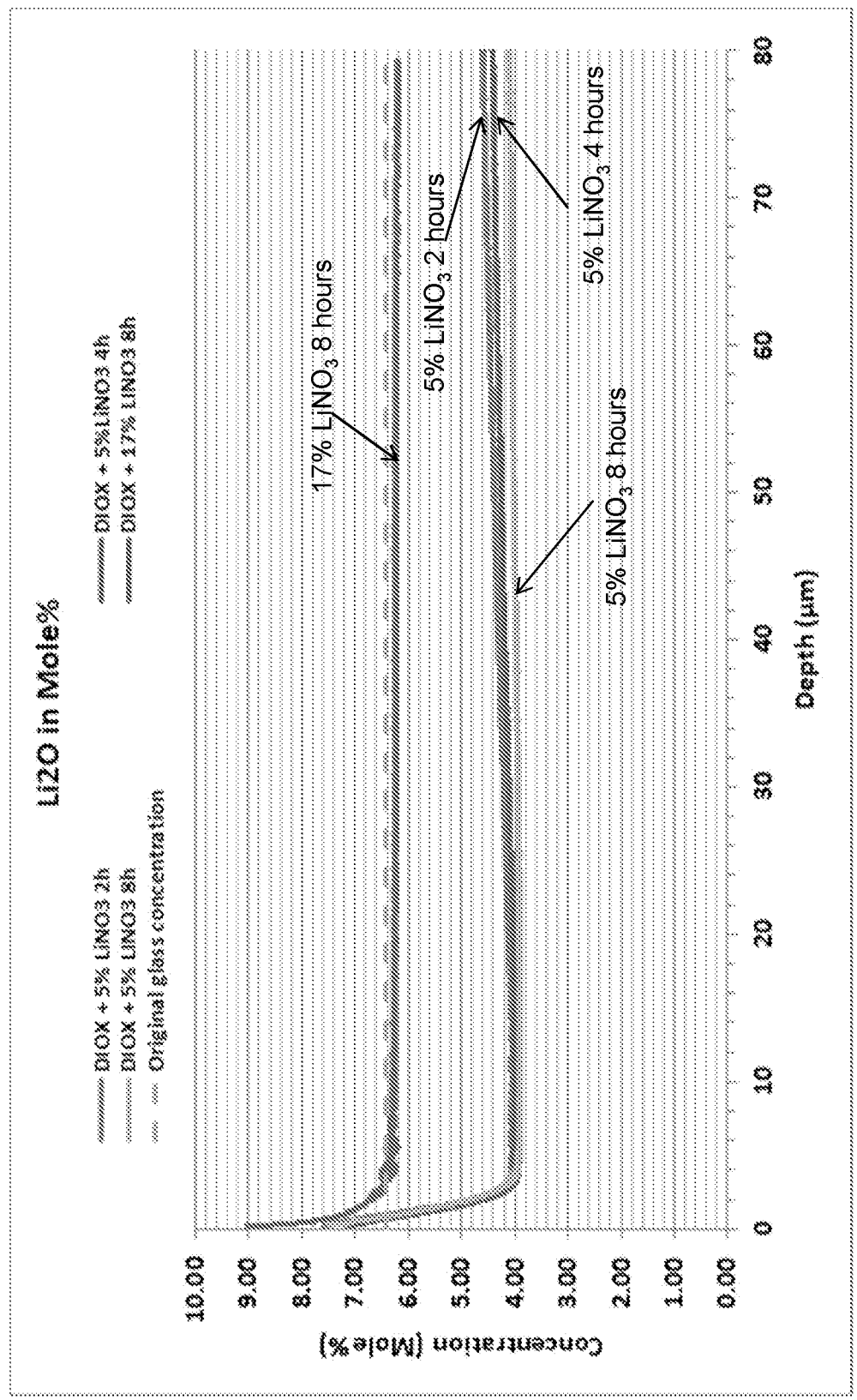
FIG. 14 is $Li_2O$ concentration as a function of depth in a glass article after a dual ion exchange process and a variety of reverse ion exchange processes.

The ion exchanged glass article was then subjected to a variety of reverse ion exchange treatments. A reverse ion exchange bath including 5 wt % $LiNO_3$ at 380° C. was employed for reverse ion exchange treatments of 2 hours, 4 hours and 8 hours. A reverse ion exchange bath including 17 wt % $LiNO_3$ at 420° C. was employed for a reverse ion exchange treatment of 8 hours. As shown in FIGS. 11 and 12, the $K_2O$ concentration decreased with increasing reverse ion exchange time, and the 17 wt % $LiNO_3$ bath reduced the $K_2O$ concentration more than the 5 wt % $LiNO_3$ bath. The $K_2O$ concentrations shown in FIGS. 11 and 12 were measured using the GDOES method. FIGS. 13 and 14 show the $Na_2O$ concentrations and $Li_2O$ concentrations in the samples. As demonstrated in FIGS. 13 and 14, the 17 wt % $LiNO_3$ reverse ion exchange bath produced $Na_2O$ concentrations and $Li_2O$ concentrations that were approximately the same as the original glass composition.

Example 2

Figure 15:
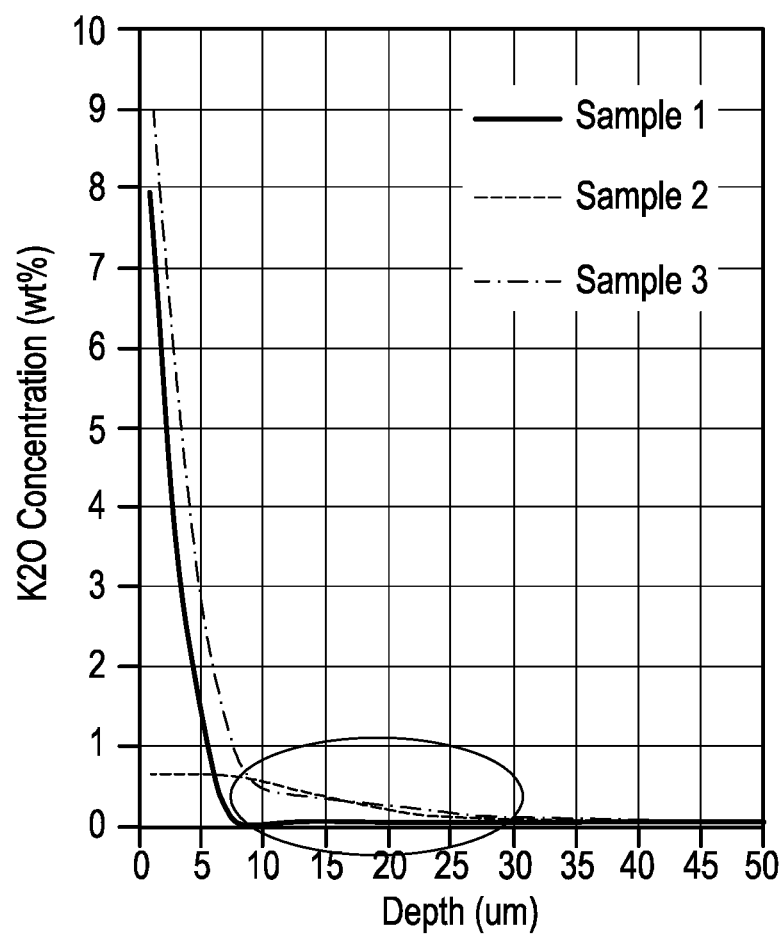
FIG. 15 is the $K_2O$ concentration as a function of depth in a glass article after various stages in a rework reverse ion exchange process.
Figure 16:
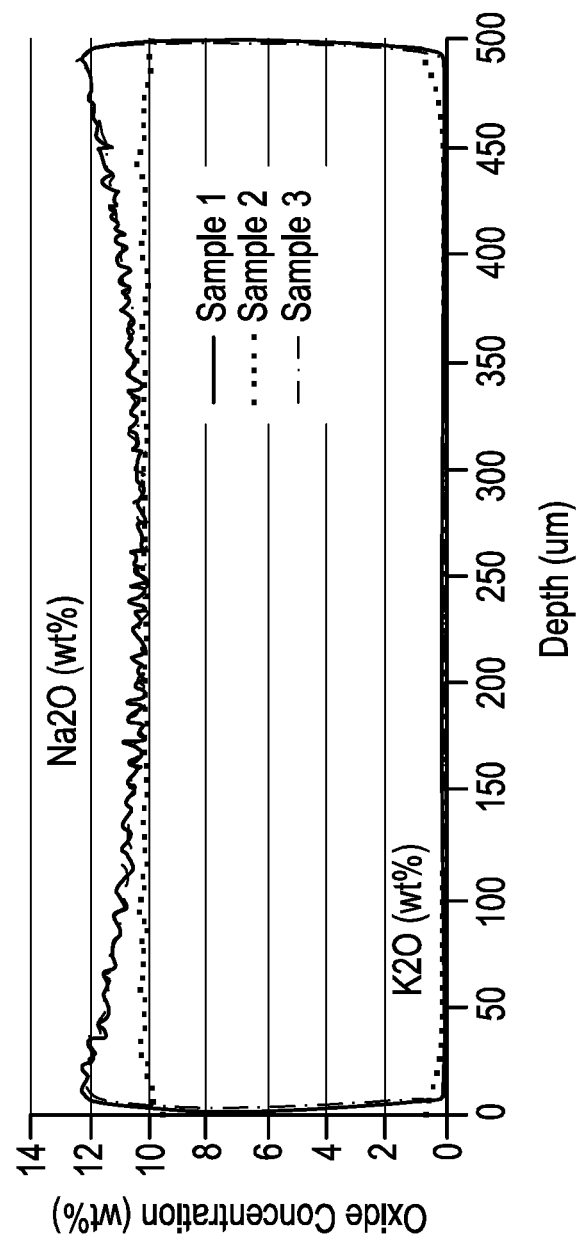
FIG. 16 is the oxide concentrations as a function of depth in a glass article after various stages in a rework reverse ion exchange process.

The glass composition of Example 1 was formed into a glass article that was then processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange process included a bath containing 5 wt % NaNO$_3$ and 95 wt % KNO$_3$ at a temperature of 370° C. for 20 minutes. The ion exchanged glass article was then subjected to a reverse ion exchange process. The reverse ion exchange process included a bath containing 17 wt % LiNO$_3$ and 83 wt % KNO$_3$ at a temperature of 420° C. for 8 hours. A chemical etching process was then employed to remove 4 μm per side of the glass article with hydrofluoric acid. The etched glass article was then re-ion exchanged in a bath containing 36 wt % NaNO$_3$ and 64 wt % KNO$_3$ at a temperature of 380° C. for 80 minutes and a second ion exchange bath containing 5 wt % NaNO$_3$ and 95 wt % KNO$_3$ at a temperature of 370° C. for 20 minutes. The K$_2$O concentration of the ion exchanged glass article is represented by the solid line in FIG. 15, the K$_2$O concentration of the reverse ion exchanged glass article is represented by the dashed line in FIG. 15, and the K$_2$O concentration of the re-ion exchanged glass article is represented by the dot-dashed line in FIG. 15. The circled region in FIG. 15 highlights the additional K$_2$O concentration that results from the reverse ion exchange process. FIG. 16 shows the oxide concentrations in the glass article as a function of depth, with the lines in FIG. 16 corresponding to the same stages of the process as in FIG. 15.

Example 3

Figure 17:
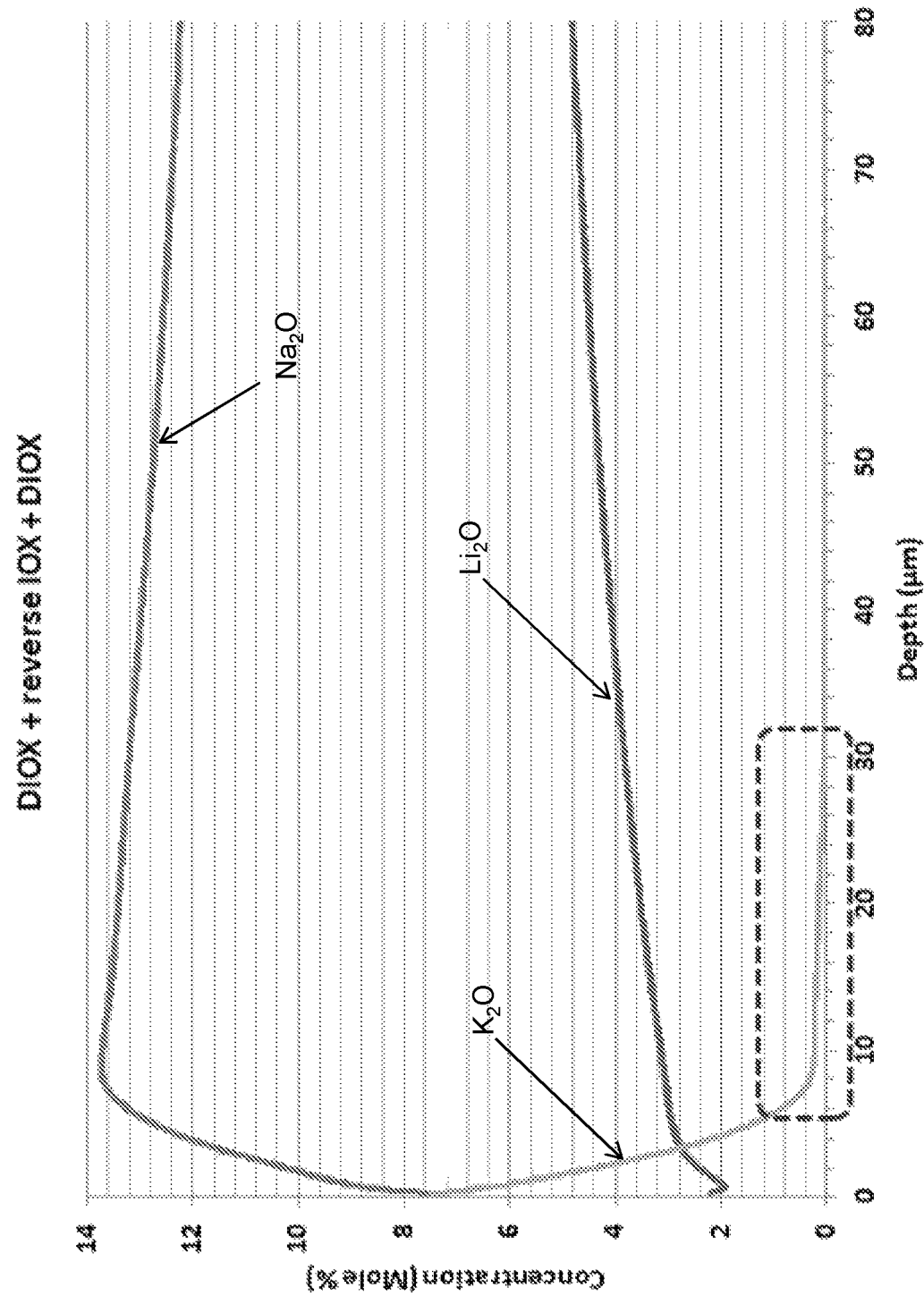
FIG. 17 is the oxide concentrations as a function of depth in a glass article after a rework reverse ion exchange process.

The glass composition of Example 1 was formed into a glass article with a thickness of 0.5 mm and processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 10 wt % NaNO$_3$ and 90 wt % KNO$_3$ at a temperature of 370° C. for 20 minutes. The ion exchanged glass article was then subjected to a reverse ion exchange process. The reverse ion exchange process included a bath containing 17 wt % LiNO$_3$ and 83 wt % KNO$_3$ at a temperature of 420° C. for 8 hours. A chemical etching process was then employed to remove 4 μm per side of the reverse ion exchanged glass article with hydrofluoric acid. The etched glass article was then re-ion exchanged in a bath containing 36 wt % NaNO$_3$ and 64 wt % KNO$_3$ at a temperature of 380° C. for 80 minutes and a second ion exchange bath containing 10 wt % NaNO$_3$ and 90 wt % KNO$_3$ at a temperature of 370° C. for 20 minutes. The oxide concentration was measured by GDOES, as shown in FIG. 17. The additional K$_2$O concentration as a result of the reverse ion exchange is highlighted by the dashed rectangle in FIG. 17.

Example 4

The glass composition of Example 1 was formed into a glass article and processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. Surface scratches and other defects were then removed from the ion exchanged glass article by removing 3 μm from the surface per side of the glass article. The glass article was then subjected to a reverse ion exchange process. The reverse ion exchange process included a bath containing 17 wt % LiNO$_3$ and 83 wt % KNO$_3$ at a temperature of 420° C. for 8 hours. The reverse ion exchanged glass article was then processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. The depth of layer of potassium (DOL), depth of compression (DOC), compressive stress (CS), compressive stress knee (CSk), and central tension (CT) for the ion exchanged glass article before removing material from the surface and the re-ion exchanged glass article are reported in Table 1.

TABLE 1

|  | DOL (μm) | DOC (μm) | CS (MPa) | CSk (MPa) | CT (MPa) |
|---|---|---|---|---|---|
| Ion Exchanged | 8.1 | 100.0 | 881.3 | 97.8 | 63.8 |
| Re-Ion Exchanged | 9.1 | 98.4 | 874.3 | 83.1 | 61.3 |

Example 5

Figure 18:
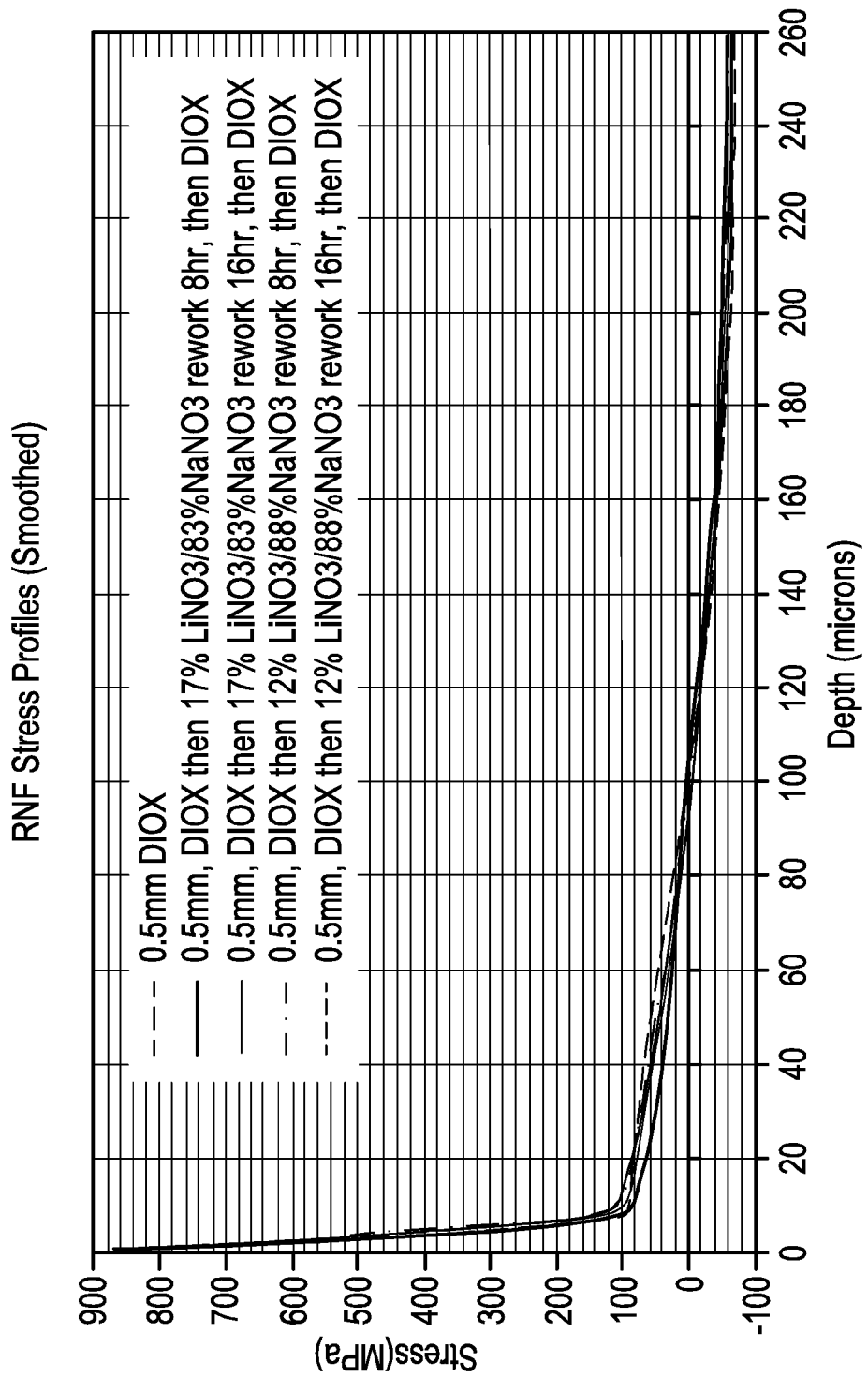
FIG. 18 is the stress of ion exchanged and reverse ion exchanged glass articles as a function of depth below a surface of the glass articles.

The glass composition of Example 1 was formed into glass articles with a thickness of 0.5 mm and processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. The ion exchanged glass articles were then subjected to a reverse ion exchange treatment. One reverse ion exchange treatment included a bath containing 17 wt % LiNO$_3$ and 83 wt % NaNO$_3$ at a temperature of 420° C. for 8 hours. Another reverse ion exchange treatment included a bath containing 17 wt % LiNO$_3$ and 83 wt % NaNO$_3$ at a temperature of 420° C. for 16 hours. Another reverse ion exchange treatment included a bath containing 12 wt % LiNO$_3$ and 88 wt % NaNO$_3$ at a temperature of 420° C. for 8 hours. Another reverse ion exchange treatment included a bath containing 12 wt % LiNO$_3$ and 88 wt % NaNO$_3$ at a temperature of 420° C. for 16 hours. The reverse ion exchanged glass articles were then subjected to the dual ion exchange treatment again. The resulting smoothed stress profiles of the glass articles as measured by RNF are similar, as shown in FIG. 18.

Example 6

Figure 19:
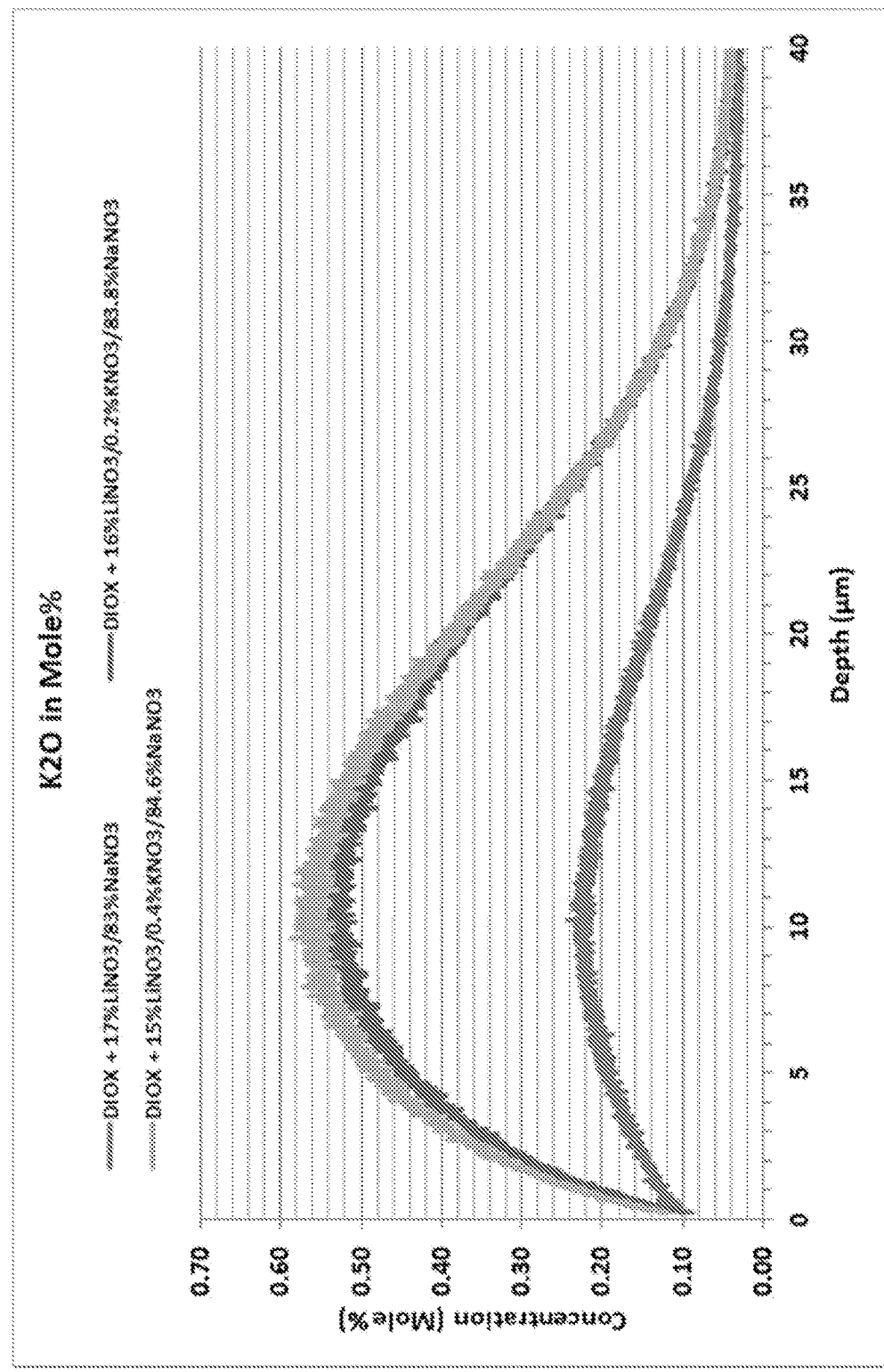
FIG. 19 is the $K_2O$ concentration as a function of depth in a glass article for various reverse ion exchange processes.
Figure 20:
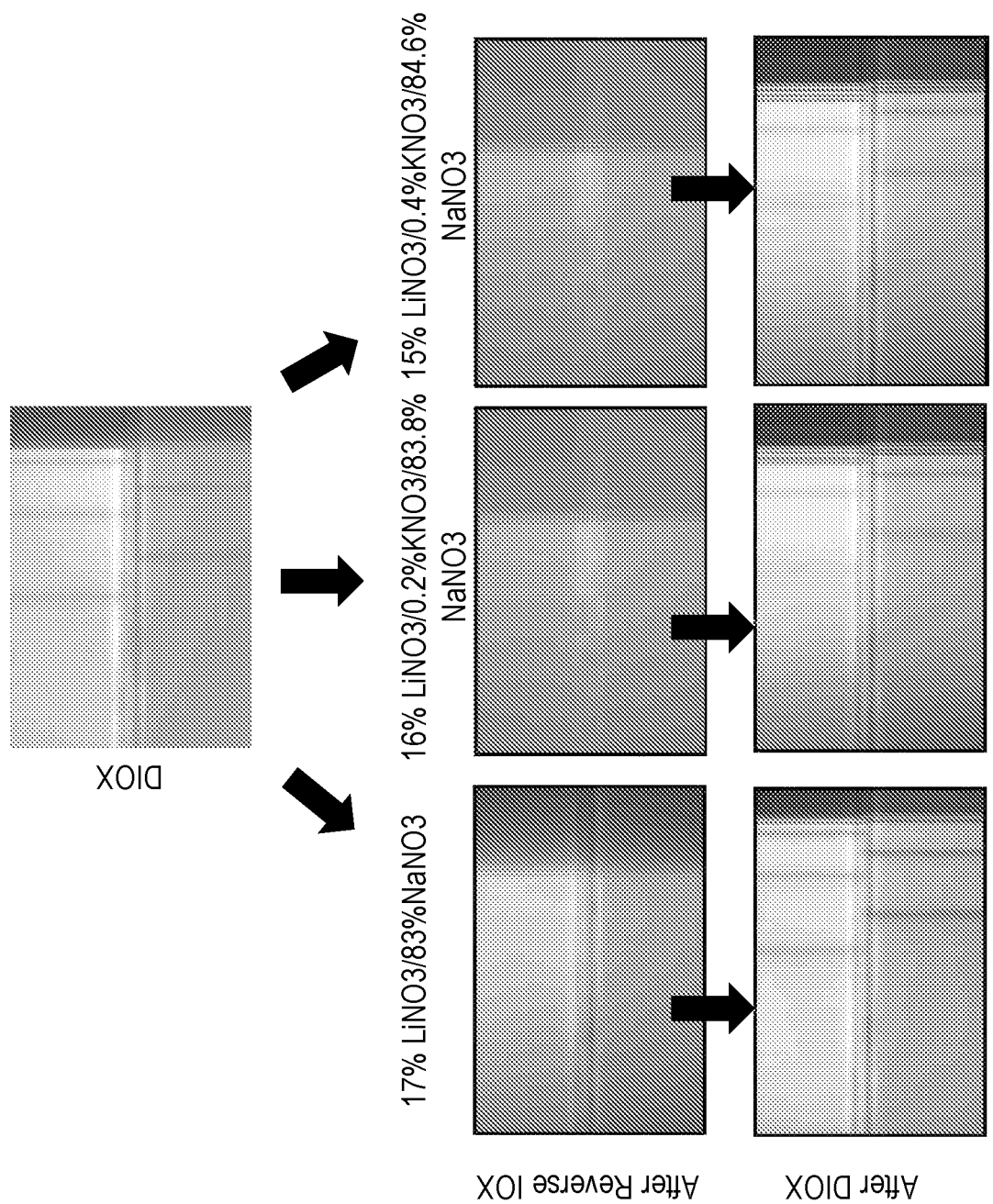
FIG. 20 is a series of FSM spectra for glass articles at different stages in a reverse ion exchange rework process.

The glass composition of Example 1 was formed into glass articles with a thickness of 0.5 mm and processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. The ion exchanged glass articles were then subjected to reverse ion exchange treatments. One reverse ion exchange treatment included a bath containing 17 wt % LiNO$_3$ and 83 wt % NaNO$_3$ at a temperature of 420° C. for 8 hours. Another reverse ion exchange treatment included a bath containing 16 wt % LiNO$_3$, 0.2 wt % KNO$_3$, and 83.8 wt % NaNO$_3$ at a temperature of 420° C. for 8 hours. Another reverse ion exchange treatment included a bath containing 15 wt % LiNO$_3$, 0.4 wt % KNO$_3$, and 84.6 wt % NaNO$_3$ at a temperature of 420° C. for 8 hours. The K$_2$O concentration as measured by GDOES after the reverse ion exchange process as a function of depth below the glass article surface is shown in FIG. 19. The reverse ion exchanged glass articles were then subjected to the dual ion exchange process again. FSM spectra of the ion exchanged glass articles, the reverse ion exchanged glass articles, and the re-ion exchanged glass articles are shown in FIG. 20. The dense fringes in the FSM spectra for the re-ion exchanged glass articles (after DIOX) shown in FIG. 20 are correlated to the additional K$_2$O concentration present in the glass articles as a result of the reverse ion exchange.

Example 7

Figure 21:
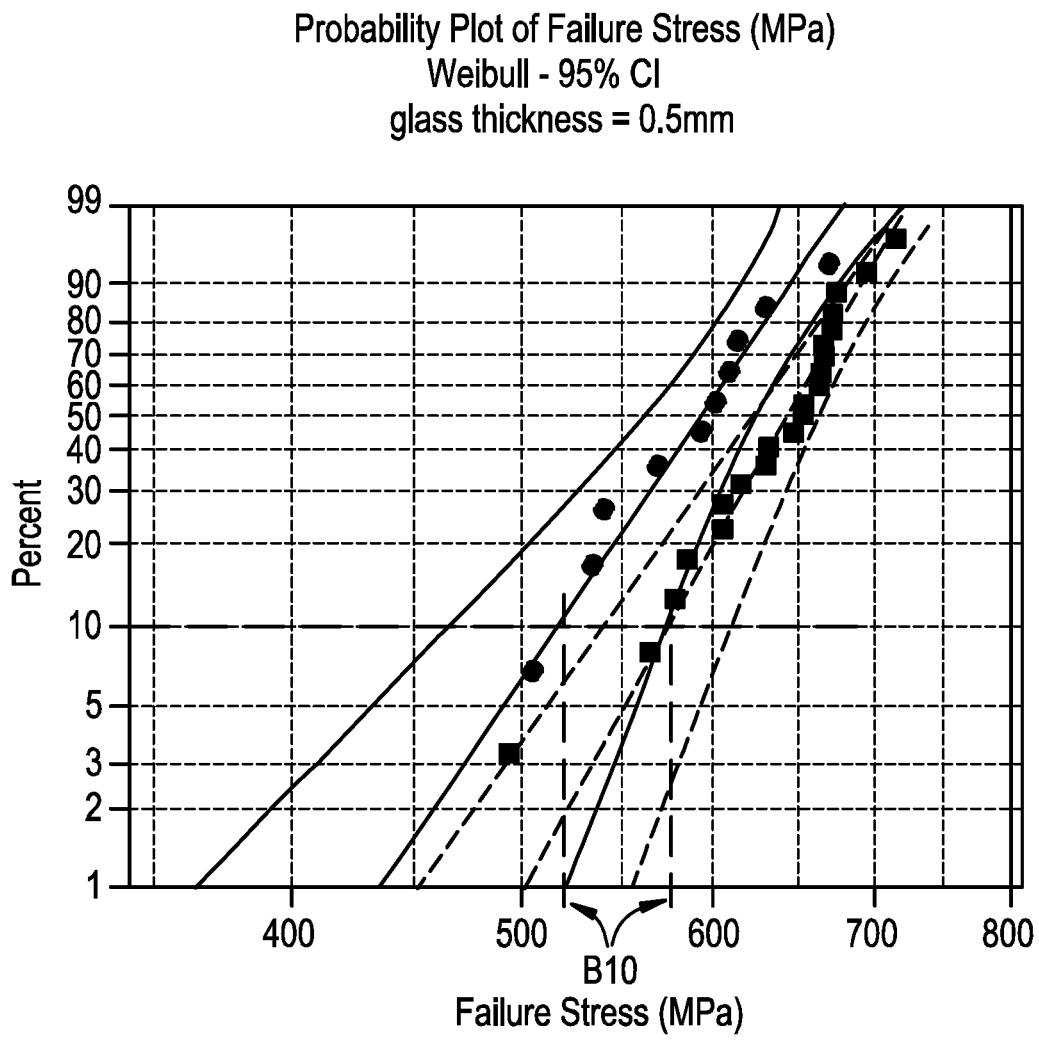
FIG. 21 is a Weibull plot of edge strength as measure using a 4 point bend test.

The glass composition of Example 1 was formed into glass articles with a thickness of 0.5 mm and a machined edge profile. The glass articles were processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. One of the glass articles was then subjected to a reverse ion exchange treatment including a bath containing 17 wt % LiNO$_3$ and 83 wt % NaNO$_3$ at a temperature of 420° C. for 8 hours. The reverse ion exchanged glass article was then acid etched with hydrofluoric acid to remove 3 from the surface of the glass article. The acid etched glass article was then subjected to the dual ion exchange treatment as a re-ion exchange treatment. The failure stress at which 10% of the glass articles are expected to fail (B10) was determined, as shown in FIG. 21. The failure stress was measured using a 4 point bend test. The control shown in FIG. 21 is a glass article after the dual ion exchange treatment, but before the reverse ion exchange. The B10 value may be higher for the re-ion exchanged glass article due to an increase in edge strength associated with acid etching to reduce surface flaws.

Example 8

The glass composition of Example 1 was formed into glass articles with a thickness of 0.5 mm and a machined edge profile. The glass articles were processed with a dual ion exchange treatment. The dual ion exchange process included a first and second ion exchange, where the first ion exchange included a bath containing 36 wt % NaNO$_3$ and 64 wt % KNO$_3$ at a temperature of 380° C. for 80 minutes. The second ion exchange included a bath containing 5 wt % NaNO$_3$ and 95 wt % KNO$_3$ at a temperature of 370° C. for 20 minutes. One of the glass articles was then subjected to a reverse ion exchange treatment including a bath containing 17 wt % LiNO$_3$ and 83 wt % NaNO$_3$ at a temperature of 420° C. for 8 hours. The reverse ion exchanged glass article was then processed to remove 3 μm from the surface of the glass article. The surface processed glass article was then subjected to the dual ion exchange treatment as a re-ion exchange treatment.

Figure 22:
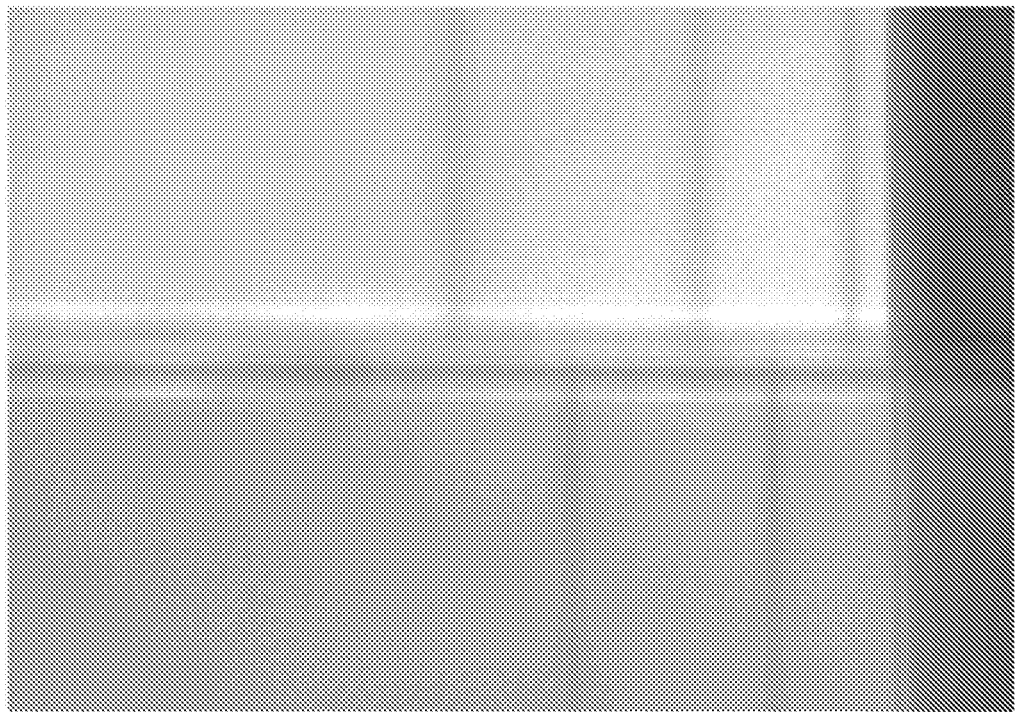
FIG. 22 is a FSM spectra for an ion exchanged glass article.
Figure 23:
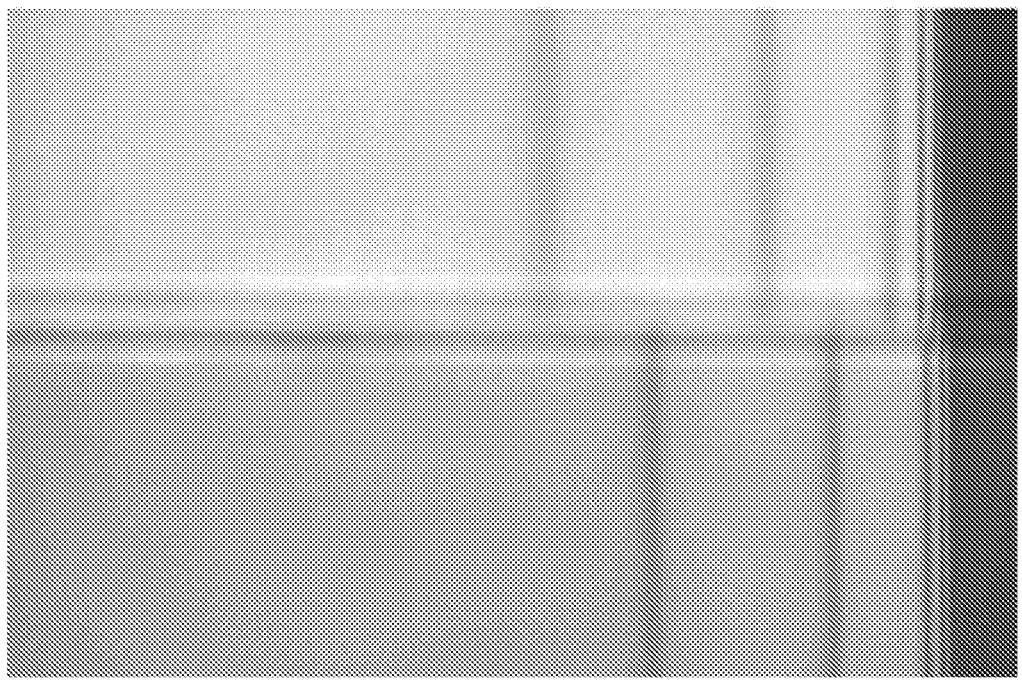
FIG. 23 is a FSM spectra for a reverse ion exchanged glass article.

Prism-coupling reflectance spectra were obtained using the prism-coupling surface stress meter FSM-6000, where the ion-exchanged glass substrate was optically coupled to the prism using an interfacing oil with refractive index of 1.72 at 595 nm, the same index as the prism. The prism-coupling reflectance spectra for the non-reverse ion exchanged glass article is shown in FIG. 22, with the upper half of FIG. 22 corresponding to the transverse magnetic (TM) polarization. The prism-coupling reflectance spectra for the reverse ion exchanged glass article is shown in FIG. 23, with the upper half of FIG. 23 corresponding to the TM polarization.

Figure 24:
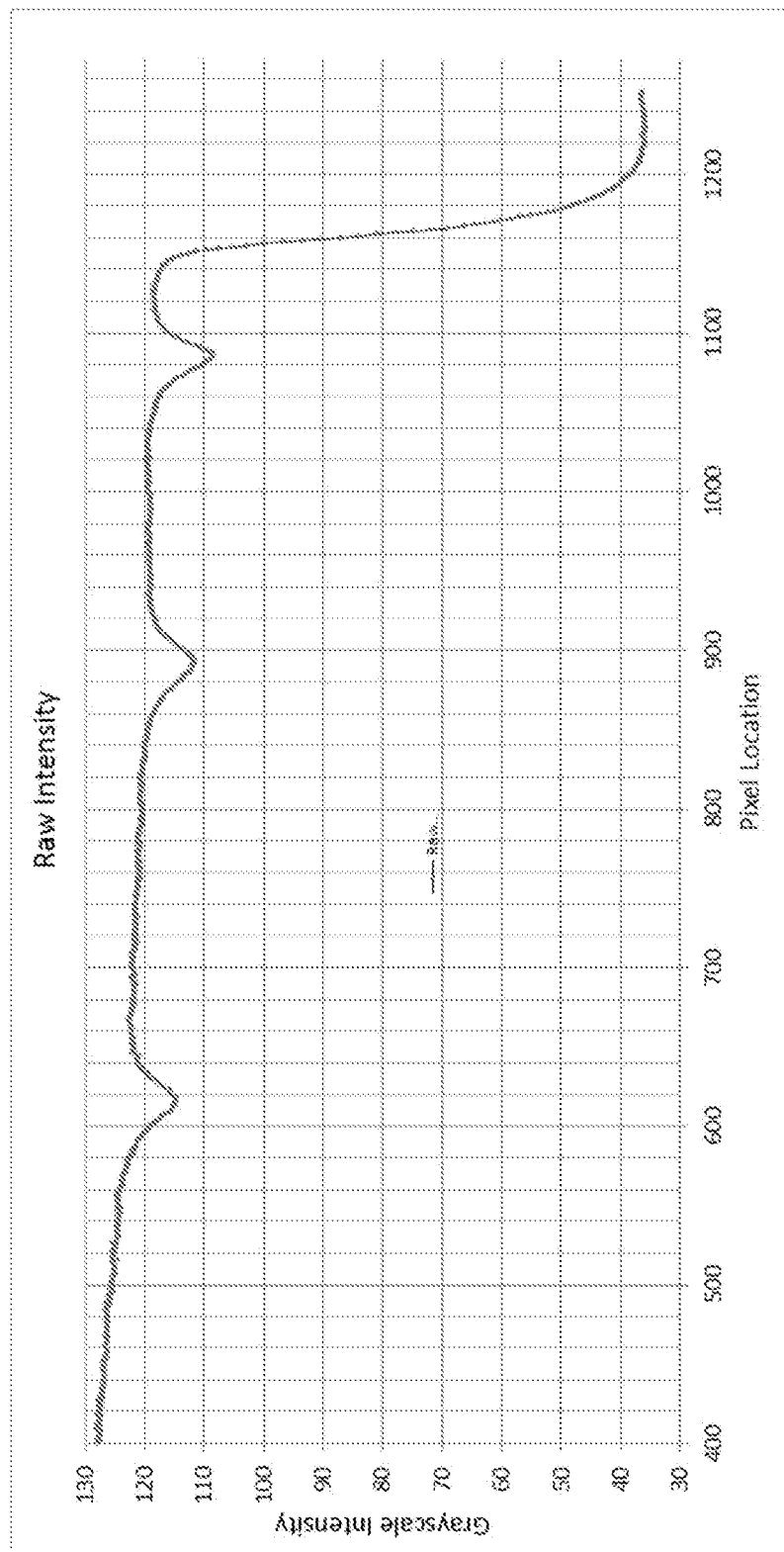
FIG. 24 is the prism-coupling-intensity signal of FIG. 22.
Figure 25:
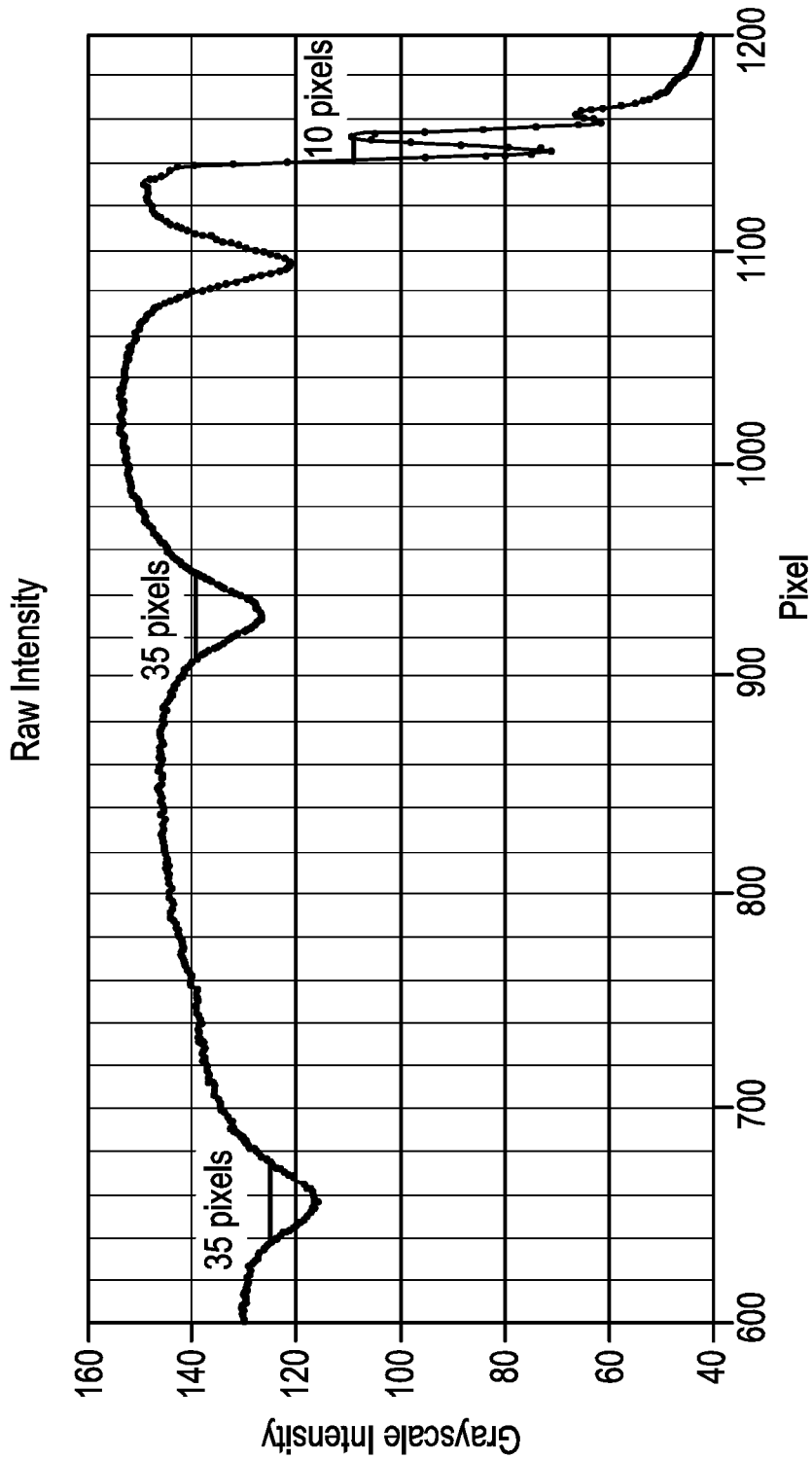
FIG. 25 is the prism-coupling-intensity signal of FIG. 23.

The prism-coupling-intensity signals of the glass articles were then obtained from the prism-coupling reflectance spectra using the methods described in U.S. Pat. No. 9,140,543 entitled "Systems and methods for measuring the stress profile of ion-exchanged glass," which is incorporated herein by reference in its entirety. The signals of about 250 rows of pixels from the sensor area assigned to the transverse magnetic (TM) polarization were summed up to form a single signal where each point corresponds to the average of the corresponding column of about 250 pixels. This helps improve the signal-to-noise ratio, when compared to taking the data from a single row of pixels. The prism-coupling-intensity signal for the non-reverse ion exchanged glass article is shown in FIG. 24, and the prism-coupling-intensity signal for the reverse ion exchanged glass article is shown in FIG. 25. The prism-coupling-intensity signals may alternatively be calculated based on the transverse electronic (TE) polarization, shown in the lower half of FIG. 22, with the expectation of similar results.

As shown in FIG. 24, the prism-coupling-intensity signal includes three dips in the in the signal in the region of total internal reflection, with each dip having a breadth of from about 30 to 40 pixels measured as the full-width at half-maximum, as commonly understood in the art. These dips indicate coupling resonances and may correspond to the K$_2$O present in the K$_2$O spike at the surface of the ion exchanged glass articles. FIG. 25 demonstrates that the reverse ion exchanged glass article exhibits additional narrower dips in the signal that occur close to the transition from total internal reflection to partial reflection that are not present for the non-reverse ion exchanged glass articles. The additional narrow dips in FIG. 25 correlate to the residual K$_2$O concentration present in the reverse ion exchanged glass article that is not present in the non-reverse ion exchanged glass article. Without wishing to be bound by any particular theory, the dips associated with the residual K$_2$O concentration may be narrower than the other dips in the signal because the residual K$_2$O concentration is present at a deeper depth than the K$_2$O in the spike located at the surface of the glass articles, producing narrower coupling references. The narrow dips shown in FIG. 25 have a breadth of about 10 pixels, as measured by the full-width half-maximum method. Thus, the broad dips of FIG. 25 have a breadth that is about 3.5 times greater than the narrow dips.

Figure 26:
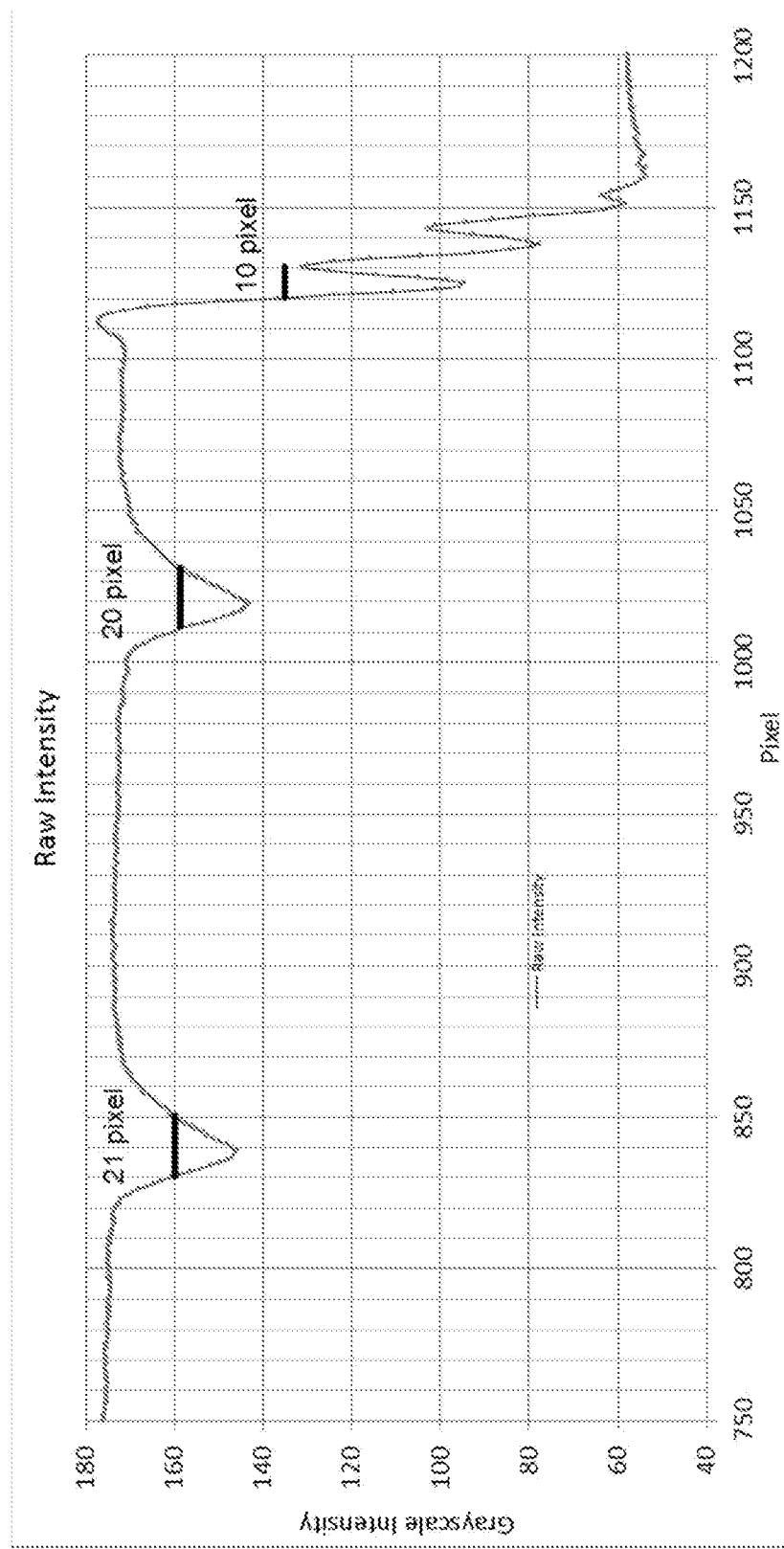
FIG. 26 is the prism-coupling-intensity signal of a reverse ion exchanged glass article.

As shown in FIG. 25, the narrower dips in the signal have a breadth of at least about 3.5 times lower than the breadth of the dips in the region of total internal reflection. For purposes of confirmation, the prism-coupling-intensity signal of a glass article with the glass composition of Example 1 was subjected to a single step ion exchange in an ion exchange bath of 36 wt % NaNO$_3$ and 64 wt % KNO$_3$ at a temperature of 380° C. for 100 minutes, a reverse ion exchange in a reverse ion exchange bath of 17 wt % LiNO$_3$ and 83 wt % NaNO$_3$ at a temperature of 420° C. for 8 hours, and then re-ion exchanged under the same conditions as the single step ion exchange. The prism-coupling-intensity signal of this additional example is shown in FIG. 26. As shown in FIG. 26, the broad dips in the total internal reflectance region have a breadth of about 20 pixels and the narrow dips have a breadth of about 10 pixels, as determined by the full-width half-maximum method. Thus, the broad dips have a breadth that is about 2 times greater than the narrow dips. Based on FIGS. 25 and 26, the reverse ion exchanged glass article prism-coupling-intensity signal has a first coupling resonance breadth that is at least 1.8 times greater than a second coupling resonance in the prism-coupling-intensity signal; such as at least 2 times greater, or at least 3.5 times greater.

The breadth of the dips in the prism-coupling-intensity signal may be measured by alternative methods where the full-width at half-maximum method is not possible, such as asymmetric coupling resonances. In some cases, the breadths of the coupling resonances may be measured as half-width at half-maximum. In another case, the breadth may be measured at the 20% change in intensity measured from the darkest point of the coupling resonance relative to the entire difference between the darkest point and the reference (pedestal) intensity.

Alternatively, the magnitude of the second derivative of the prism-coupling-intensity signal may be used to distinguish the reverse ion exchanged glass articles from non-reverse ion exchanged glass articles. As commonly practiced in the art, the prism-coupling-intensity signal was conditioned by a modest low-pass filtering to reduce the high-frequency noise. In the present example the LOESS algorithm (W. S. Cleveland, "Robust Locally Weighted Regression And Smoothing Scatterplots", Journal of the American Statistical Association, Vol. 74, No. 368 (December 1979), p. 829-836) was employed to smooth the prism-coupling-intensity signal. Other low-pass filtering approaches may be applied with a similar effect, as long as the underlying signal is not significantly distorted and the coupling resonances are not substantially broadened. The prism-coupling-intensity signal was also histogram-shifted to improve the contrast by subtracting the lowest value of the signal from the intensity at every point, and the processed signal was then rescaled to cover the intensity range 0-256. The histogram shift does not affect the relationship between the derivatives of different modes. In the present example, the image width is 1272 columns of pixels.

Another commonly used method may be utilized, such as a moderate high-pass filter or band-pass filter, to remove a slowly-varying component of the prism-coupling-intensity signal resulting from a slowly-varying angular distribution of the illumination intensity. This additional filtering was not necessary in the present example, but may be useful to reduce distortion (causing asymmetry) of the broader coupling resonances which are more significantly affected by such slow variation of the angular distribution of illumination intensity. An exemplary high-pass filter would have a spatial frequency cutoff that is in the range from 1/L up to about 5/L, where L is the length of the signal, e.g., the number of columns of pixels. In some cases, the spatial frequency cutoff of high-pass filtering may be as high as 1/dL, where dL is the spacing in pixel columns between the two farthest-spaced neighboring coupling resonances.

Figure 27:
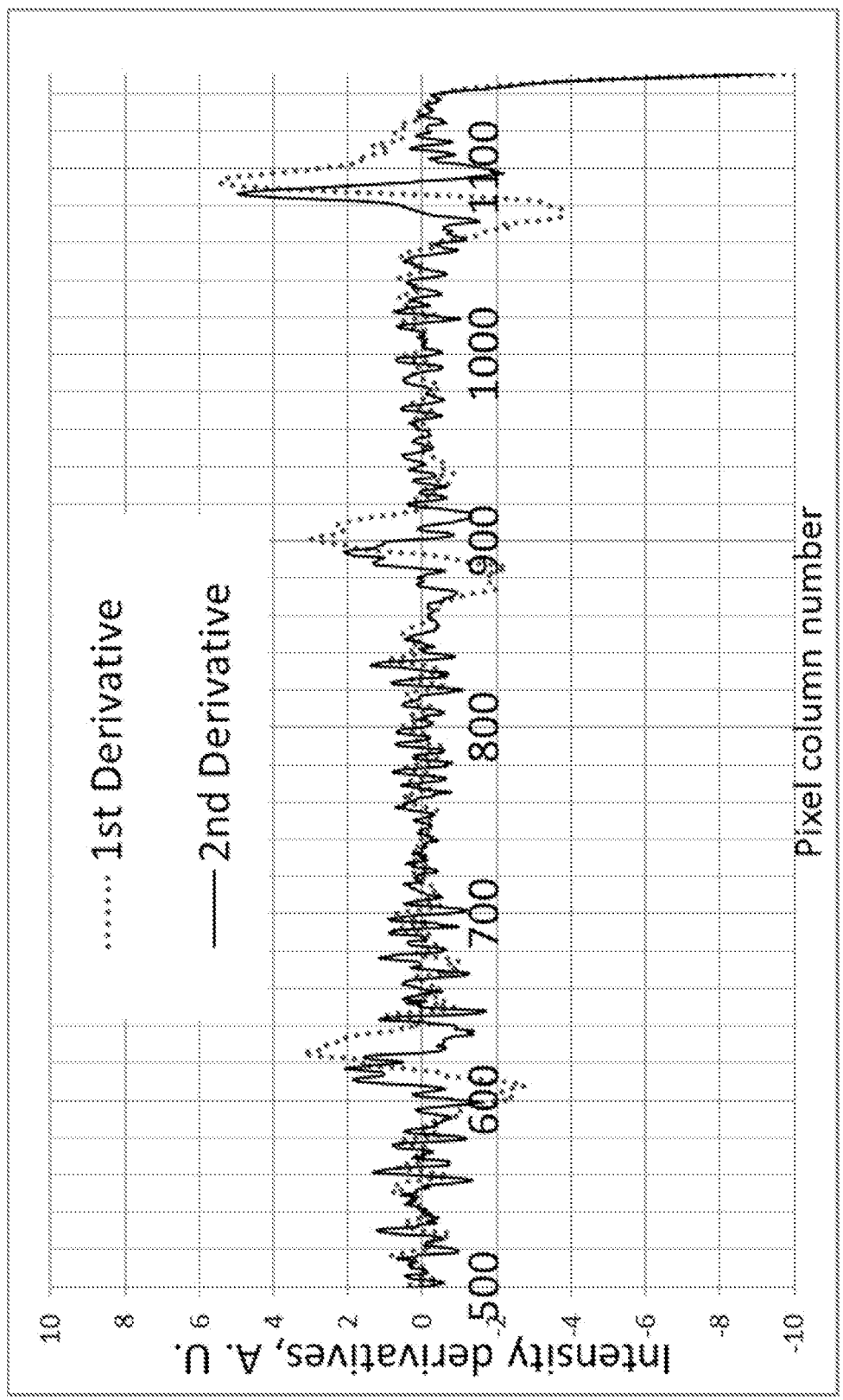
FIG. 27 is a plot of the first-derivative and the second-derivative of FIG. 24.

FIG. 27 shows the first derivative and the second derivative of the prism-coupling-intensity signal from FIG. 24 processed as described above. In this example, the maxima of the second derivative at the locations of the coupling resonances (pixel column positions 616, 893, and 1086) are all within a factor of 2.6 of each other. It is typical for the coupling resonances of non-reverse ion exchanged glass articles to exhibit a local maximum of the second derivative that is within a factor of 3 of each other. The local maximums of the second derivative are located at the zero-crossing of the first-derivative, which indicates the location of a coupling resonance. Noise-induced zero-crossings may be present in the first-derivative, and such noise-induced zero-crossings are easily rejected by software settings commonly practiced in the art, such as minimum requirements for local intensity contrast, a minimum requirement for the local second derivative of the signal, a requirement for a minimum spacing to the next zero-crossing of the first derivative, and also comparison of locations of neighboring detected zero-crossings to determine if they follow a sequence of that is typical of optical modes that are physically possible. It is also easy for an operator to manually identify the coupling resonances in the prism-coupling-intensity signal, and reject any noise-induced false positives. Noise-induced zero-crossings are generally too closely spaced, and do not allow significant excursion of the derivatives over a large number of pixels, providing for easy rejection of such noise-induced false-positives.

Figure 28:
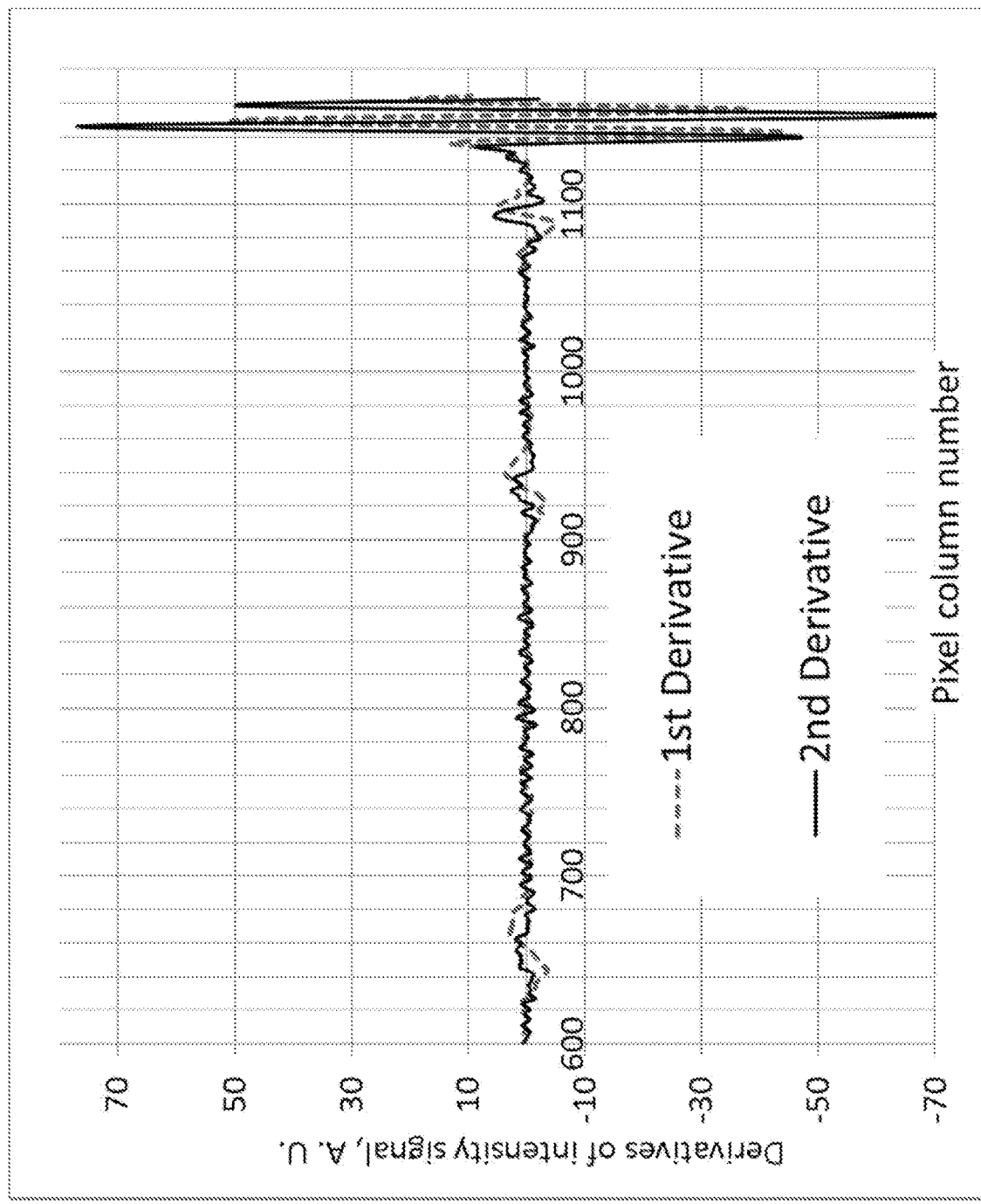
FIG. 28 is a plot of the first-derivative and the second-derivative of FIG. 25.

FIG. 28 shows the first and second derivatives of the intensity signal from FIG. 25 processed as described above. The coupling resonances are identified at pixel column numbers 657, 930, 1093, 1146 and 1159, with any false-positives being rejected by software settings. While the first three coupling resonances have a maximum second derivative that is within a factor of 3.4 of each other (1.67, 2.59, and 5.59, respectively). The last two coupling resonances have second derivative maxima at 76.9 and 49.9, respectively. Thus, the last two coupling resonances have a second derivative maximum that ranges from 8.9 to 46 times the maximum second derivative of any of the first three coupling resonances.

Figure 29:
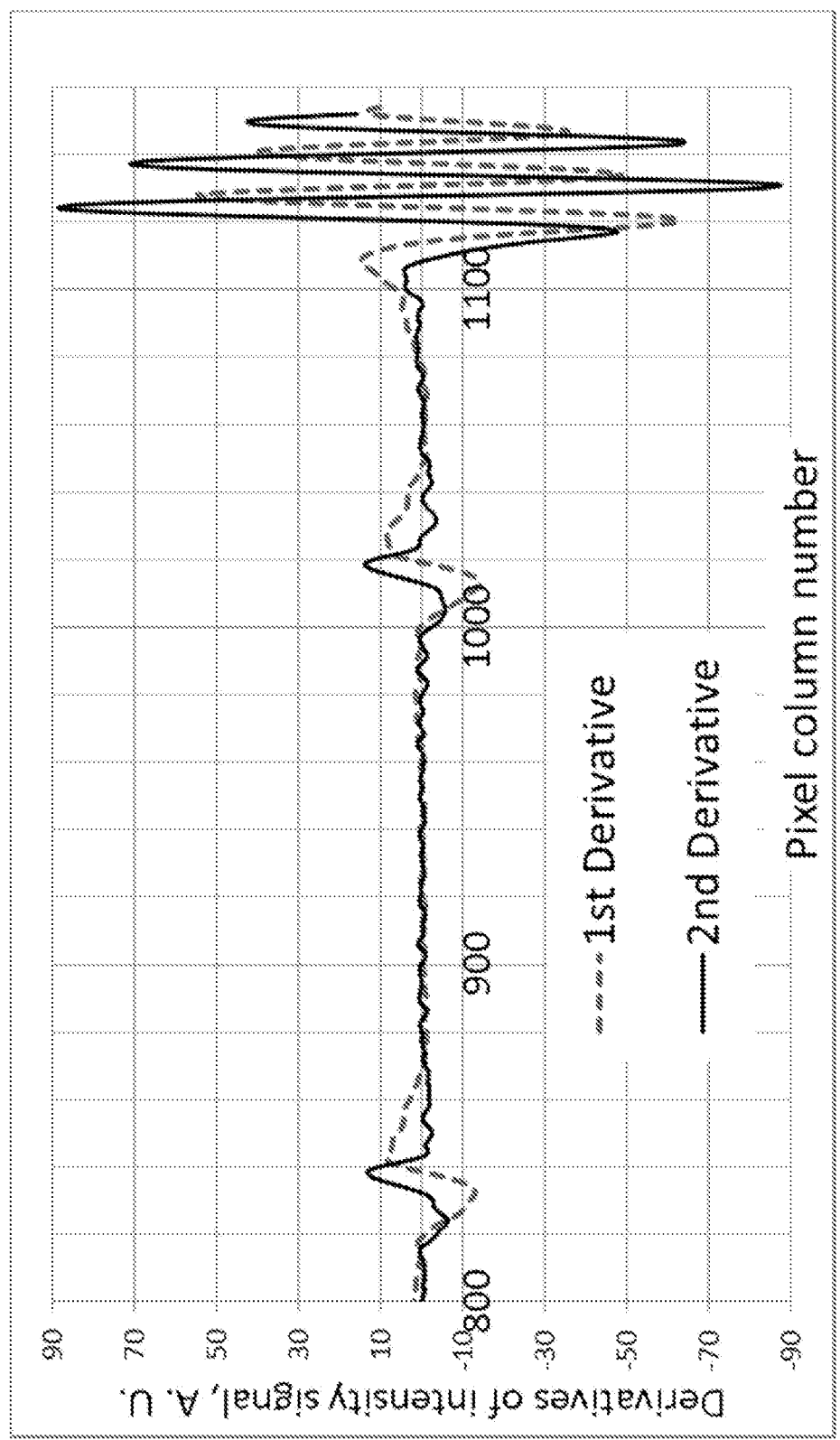
FIG. 29 is a plot of the first-derivative and the second-derivative of FIG. 26.

FIG. 29 shows the first and second derivatives of the intensity signal from FIG. 26 processed as described above. The coupling resonances are located at pixel columns 838, 1023, 1124, 1137, and 1150, rounded to the nearest column for simplicity. The second-derivative maxima at the first and second coupling resonances are approximately equal at 13.5 and 14.0, respectively. The second-derivative maxima of the last 3 coupling resonances are 88.7, 71.1, and 42.5, respectively. Thus, the last 3 coupling resonances have a second-derivative maxima that ranges from 3 to 6.6 times the second-derivative maxima of any of the first two coupling resonances. Additionally, relative to the first coupling resonance, shown on the left of FIG. 29, the second derivative maxima of the last 3 coupling resonances are at least 3.15 to 6.6 times larger.

In conducting the analysis of these examples, glass articles that were substantially free of warp were selected, to avoid broadening of the coupling resonances due to warp. Additionally, the index fluid utilized in the measurements should have a refractive index between the refractive index of the glass article and the refractive index of the prism, preferably closer to the refractive index of the prism. For example, if the glass article has a refractive index in the range 1.49-1.52, and the prism index is 1.72, the preferred range for refractive index of the index fluid would be 1.6-1.72. Optical light blocks may be employed to reveal the broad coupling resonances with adequate contrast, as known in the state-of-the art.

The second-derivative maxima were measured without interpolation. Alternatively, a more precise comparison is possible if the signal is interpolated on a denser array of data points, such as 5 data points per pixel, and then low-passfiltered, since the second-derivative maxima may occur between pixels. In such a case, the peak values of the second derivatives for the narrowest coupling resonances will be higher, and closer to their true values. The broader coupling resonances would not be substantially affected by the limitations of the measurement sensor, because they are usually sampled by many more pixels per coupling resonance linewidth.

From these examples, it is demonstrated that when there are at least 3 broad coupling resonances that have second-derivative maxima within a factor of 3.5 of each other, the reverse ion exchanged glass articles exhibit at least one coupling resonance with a second-derivative maxima that is more than a factor of 4 larger than that of the first coupling resonance, such as more than a factor of 5 greater, a factor of 6 greater, a factor of 9 greater, or higher.

Further, when there are only 2 broad coupling resonances having a second-derivative maxima within a factor of 2 of each other, the reverse ion exchanged glass articles exhibit at least one coupling resonance whose second derivative is at least a factor of 3 higher than the lowest second derivative maxima of any of the coupling resonances, such as a factor of 4 higher, a factor of 5 higher, a factor of 6 higher, or greater.

In an alternative measurement process, the prism-coupling measurement may be obtained at a longer wavelength, such as 780 nm. In some cases, the resolution of the prism-coupling measurement may not be adequate due to close spacing of the narrow coupling resonances, or due to moderate warp in the glass article. The measurement at a longer wavelength such as 780 nm has reduced sensitivity to warp, and also somewhat larger spacing of the coupling resonances corresponding to a larger effective-index spacing of the guided optical modes. While the same criteria for relative widths or relative magnitudes of the second derivative of the two types of resonances can be applied at 780 nm, the low-order modes that have the higher effective index and the broader coupling resonances tend to couple more strongly at 780 nm, so a more conservative criterion may be chosen if desired. In particular, if a measurement at 595 nm is not possible or is questionable due to significant warpage, a reverse ion exchanged glass article as described herein may exhibit at least one coupling resonance at 780 nm that has a half-width at half-maximum at least 1.8 times narrower than that of another coupling resonance in the same polarization state. In a specific embodiment, the wider coupling resonance is that of the lowest-order modes having the highest effective index. In a more conservative criterion, a reverse ion exchanged glass article as described herein may exhibit at least one coupling resonance at 780 nm that has a half-width at half-maximum at least 2.5 times narrower than that of another coupling resonance in the same polarization state, such as at least 3 times narrower, at least 4 times narrower, or more. In a specific embodiment, the wider coupling resonance is that of the lowest-order mode having the highest effective index.

Similarly, if a measurement at 595 nm is not possible or is questionable due to significant warpage, a reverse ion exchanged glass article as described herein may exhibit at least one coupling resonance at 780 nm that has a peak second derivative at least 3 times higher than that of another coupling resonance in the same polarization state. In a more conservative criterion, a reverse ion exchanged glass article as described herein may exhibit at least one coupling resonance at 780 nm that has a peak second derivative that is at least 3.5 times higher than the peak second derivative of another coupling resonance in the same polarization state, such as at least 4 time higher, at least 5 times higher, at least 6 times higher, at least 8 times higher, or more. In a specific embodiment, the wider coupling resonance having the lower value of its maximum second-derivative is that of the lowest-order mode having the highest effective index.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An alkali aluminosilicate glass article comprising:
    $Li_2O$, $Na_2O$, and $K_2O$;
    a compressive stress layer extending from a surface of the alkali aluminosilicate glass to a depth of compression (DOC);
    a tensile region extending from the depth of compression into the glass article and having a maximum tensile stress of at least about 40 MPa;
    a $K_2O$ concentration profile comprising a portion wherein a $K_2O$ concentration increases to a local $K_2O$ concentration maximum; and wherein the local $K_2O$ concentration maximum has a $K_2O$ concentration of 0.5% to 15% of the $K_2O$ concentration at the surface of the alkali aluminosilicate glass article.

2. The alkali aluminosilicate glass article of claim 1, wherein the local $K_2O$ concentration maximum is located at a depth in a range from about 3 μm to about 30 μm below the surface of the alkali aluminosilicate glass article.

3. The alkali aluminosilicate glass article of claim 1, wherein the local $K_2O$ concentration maximum has a $K_2O$ concentration of 0.05 mol % to 1.2 mol %.

4. The alkali aluminosilicate glass article of claim 1, wherein a maximum compressive stress of the compressive stress layer is at least about 600 MPa.

5. A consumer electronic device comprising:
    a housing;
    electrical components provided at least partially internal to the housing, the electrical components including at least a controller, a memory, and a display, the display being provided at or adjacent to a front surface of the housing; and
    a cover article disposed at or over the front surface of the housing and over the display, wherein the housing or cover article comprises the alkali aluminosilicate glass article of claim 1.

6. A method comprising:
    reverse ion exchanging an ion exchanged glass article in a reverse ion exchange bath to produce a reverse ion exchanged glass article, wherein the reverse ion exchange bath comprises a lithium salt; and
    re-ion exchanging the reverse ion exchanged glass article in a re-ion exchange bath to form a re-ion exchanged glass article,
    wherein the re-ion exchanged glass article comprises:
        $Li_2O$, $Na_2O$, and $K_2O$;
        a compressive stress layer extending from a surface of the re-ion exchanged glass article to a depth of compression (DOC);
        a tensile region extending from the depth of compression into the re-ion exchanged glass article and having a maximum tensile stress of at least about 40 MPa;

a $K_2O$ concentration profile comprising a portion wherein a $K_2O$ concentration increases to a local $K_2O$ concentration maximum; and wherein the local $K_2O$ concentration maximum has a $K_2O$ concentration of 0.5% to 15% of the $K_2O$ concentration at the surface of the alkali aluminosilicate glass article.

7. The method of claim 6, further comprising:
removing between 1 μm and 10 μm from the surface of the reverse ion exchanged glass article.

8. The method of claim 6, wherein the reverse ion exchange bath comprises:
3 wt % to 40 wt % $LiNO_3$; and
55 wt % to 97 wt % $NaNO_3$.

9. The method of any of claim 6, wherein the reverse ion exchange bath comprises at most 1 wt % $KNO_3$.

10. The method of claim 6, further comprising reverse ion exchanging the reverse ion exchanged glass article in a second reverse ion exchange bath, wherein the second reverse ion exchange bath comprises a lithium salt.

11. The method of claim 10, wherein the second reverse ion exchange bath comprises:
0.1 wt % to about 5.0 wt % $LiNO_3$; and
$NaNO_3$.

12. The method of claim 10, wherein the second reverse ion exchange bath is substantially free of $KNO_3$.

13. The method of claim 6, wherein the re-ion exchange bath comprises:
about 15 wt % to about 40 wt % $NaNO_3$; and
about 60 wt % to about 85 wt % $KNO_3$.

14. The method of claim 6, further comprising re-ion exchanging the re-ion exchanged glass article in a second re-ion exchange bath.

15. The method of claim 14, wherein the second re-ion exchange bath comprises:
about 3 wt % to about 15 wt % $NaNO_3$; and
about 85 wt % to about 97 wt % $KNO_3$.

16. The method of claim 6, wherein the re-ion exchanged glass article comprises:
a $Li_2O$ concentration at a depth of 10 μm below a surface of the re-ion exchanged glass article of about 0.5% to about 20% of the $Li_2O$ concentration at the surface of the re-ion exchanged glass article; and
a $K_2O$ concentration at a depth of 10 μm below the surface of the re-ion exchanged glass article of about 0.5% to about 20% of the $K_2O$ concentration at the surface of the re-ion exchanged glass article.

* * * * *

UNITED STATES PATENT AND TRADEMARK OFFICE
CERTIFICATE OF CORRECTION

PATENT NO. : 11,053,162 B2
APPLICATION NO. : 15/750051
DATED : July 6, 2021
INVENTOR(S) : Andrews et al.

Page 1 of 1

It is certified that error appears in the above-identified patent and that said Letters Patent is hereby corrected as shown below:

In the Claims

Column 33, Line 15, Claim 9, after "method of" delete "any of".

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*